(12) United States Patent
Rudd

(10) Patent No.: US 7,904,568 B2
(45) Date of Patent: *Mar. 8, 2011

(54) SYSTEMS AND METHODS FOR MANAGING THE DISTRIBUTION OF ELECTRONIC CONTENT

(75) Inventor: James M. Rudd, San Francisco, CA (US)

(73) Assignee: Intertrust Technologies Corporation, Sunnyvale, CA (US)

( * ) Notice: Subject to any disclaimer, the term of this patent is extended or adjusted under 35 U.S.C. 154(b) by 24 days.

This patent is subject to a terminal disclaimer.

(21) Appl. No.: 12/534,684

(22) Filed: Aug. 3, 2009

(65) Prior Publication Data

US 2010/0030869 A1   Feb. 4, 2010

Related U.S. Application Data

(63) Continuation of application No. 10/118,215, filed on Apr. 5, 2002, now Pat. No. 7,580,988.

(60) Provisional application No. 60/282,257, filed on Apr. 5, 2001.

(51) Int. Cl.
*G06F 15/16* (2006.01)
*G06F 7/04* (2006.01)
*H04L 9/32* (2006.01)

(52) U.S. Cl. ........... 709/227; 709/217; 713/170; 726/21; 726/30

(58) Field of Classification Search .................. 709/217, 709/227; 713/170; 726/21, 30
See application file for complete search history.

(56) References Cited

U.S. PATENT DOCUMENTS

| | | | |
|---|---|---|---|
| 4,827,508 A | 5/1989 | Shear |
| 4,977,594 A | 12/1990 | Shear |
| 5,003,405 A | 3/1991 | Wulforst |
| 5,050,213 A | 9/1991 | Shear |
| 5,410,598 A | 4/1995 | Shear |
| 5,440,634 A | 8/1995 | Jones et al. |
| 5,530,235 A | 6/1996 | Stefik et al. |
| 5,534,975 A | 7/1996 | Stefik et al. |
| 5,615,268 A | 3/1997 | Bisbee et al. |
| 5,623,547 A | 4/1997 | Jones et al. |
| 5,629,980 A | 5/1997 | Stefik et al. |
| 5,634,012 A | 5/1997 | Stefik et al. |
| 5,638,443 A | 6/1997 | Stefik et al. |
| 5,715,403 A | 2/1998 | Stefik |
| 5,724,425 A | 3/1998 | Chang et al. |

(Continued)

FOREIGN PATENT DOCUMENTS

EP   0 715 247 A1   6/1996

(Continued)

OTHER PUBLICATIONS

Advisory Action dated Jul. 1, 2008, issued in related U.S. Appl. No. 10/118,215, filed Apr. 5, 2002, Rudd.

(Continued)

*Primary Examiner* — Ranodhi N Serrao
(74) *Attorney, Agent, or Firm* — Finnegan, Henderson, Farabow, Garrett & Dunner, LLP

(57) ABSTRACT

The present invention provides systems and methods for transferring electronic information from one location to another such that only one original work exists at a given time. The methods and systems of the present invention allow distribution of originals without requiring a registration authority or other entity to vouch for what constitutes an "original" piece of information, thus reducing (or eliminating entirely) the need to centrally record changes in ownership each time originals change hands.

25 Claims, 33 Drawing Sheets

U.S. PATENT DOCUMENTS

| | | | |
|---|---|---|---|
| 5,748,738 | A | 5/1998 | Bisbee et al. |
| 5,765,152 | A | 6/1998 | Erickson |
| 5,778,067 | A | 7/1998 | Jones et al. |
| 5,892,900 | A | 4/1999 | Ginter et al. |
| 5,910,987 | A | 6/1999 | Ginter et al. |
| 5,915,019 | A | 6/1999 | Ginter et al. |
| 5,917,912 | A | 6/1999 | Ginter et al. |
| 5,920,861 | A | 7/1999 | Hall et al. |
| 5,933,498 | A | 8/1999 | Schneck et al. |
| 5,940,504 | A | 8/1999 | Griswold |
| 5,943,422 | A | 8/1999 | Van Wie et al. |
| 5,949,876 | A | 9/1999 | Ginter et al. |
| 5,982,891 | A | 11/1999 | Ginter et al. |
| 5,999,949 | A | 12/1999 | Crandall |
| 6,069,952 | A | 5/2000 | Saito et al. |
| 6,112,181 | A | 8/2000 | Shear et al. |
| 6,138,119 | A | 10/2000 | Hall et al. |
| 6,157,721 | A | 12/2000 | Shear et al. |
| 6,185,683 | B1 | 2/2001 | Ginter et al. |
| 6,236,971 | B1 | 5/2001 | Stefik et al. |
| 6,237,786 | B1 | 5/2001 | Ginter et al. |
| 6,240,185 | B1 | 5/2001 | Van Wie et al. |
| 6,253,193 | B1 | 6/2001 | Ginter et al. |
| 6,292,569 | B1 | 9/2001 | Shear et al. |
| 6,363,488 | B1 | 3/2002 | Ginter et al. |
| 6,366,894 | B1 | 4/2002 | Everett et al. |
| 6,389,402 | B1 | 5/2002 | Ginter et al. |
| 6,427,140 | B1 | 7/2002 | Ginter et al. |
| 6,449,367 | B2 | 9/2002 | Van Wie et al. |
| 6,618,484 | B1 | 9/2003 | Van Wie et al. |
| 6,640,304 | B2 | 10/2003 | Ginter et al. |
| 6,658,403 | B1 | 12/2003 | Kuroda et al. |
| 6,658,568 | B1 | 12/2003 | Ginter et al. |
| 6,668,325 | B1 | 12/2003 | Collberg et al. |
| 6,697,806 | B1 | 2/2004 | Cook |
| 6,785,815 | B1 | 8/2004 | Serret-Avila et al. |
| 6,832,316 | B1 | 12/2004 | Sibert |
| 7,065,505 | B2 | 6/2006 | Stefik et al. |
| 7,152,165 | B1 | 12/2006 | Maheshwari et al. |
| 2001/0002485 | A1 | 5/2001 | Bisbee et al. |
| 2001/0042043 | A1 | 11/2001 | Shear et al. |
| 2001/0051996 | A1 | 12/2001 | Cooper et al. |
| 2002/0023214 | A1 | 2/2002 | Shear et al. |
| 2002/0048369 | A1 | 4/2002 | Ginter et al. |
| 2002/0087859 | A1 | 7/2002 | Weeks et al. |
| 2002/0112171 | A1 | 8/2002 | Ginter et al. |
| 2003/0023856 | A1 | 1/2003 | Horne et al. |
| 2003/0041239 | A1 | 2/2003 | Shear et al. |
| 2003/0046244 | A1 | 3/2003 | Shear et al. |
| 2003/0069748 | A1 | 4/2003 | Shear et al. |
| 2003/0069749 | A1 | 4/2003 | Shear et al. |
| 2003/0084003 | A1 | 5/2003 | Pinkas et al. |
| 2003/0105721 | A1 | 6/2003 | Ginter et al. |
| 2003/0163431 | A1 | 8/2003 | Ginter et al. |
| 2004/0054630 | A1 | 3/2004 | Ginter et al. |
| 2004/0059951 | A1 | 3/2004 | Pinkas et al. |
| 2004/0073813 | A1 | 4/2004 | Pinkas et al. |
| 2004/0103305 | A1 | 5/2004 | Ginter et al. |
| 2004/0123129 | A1 | 6/2004 | Ginter et al. |
| 2004/0133793 | A1 | 7/2004 | Ginter et al. |
| 2005/0050332 | A1 | 3/2005 | Serret-Avila et al. |
| 2005/0060560 | A1 | 3/2005 | Sibert |
| 2005/0060584 | A1 | 3/2005 | Ginter et al. |
| 2005/0108555 | A1 | 5/2005 | Sibert |

FOREIGN PATENT DOCUMENTS

| | | |
|---|---|---|
| WO | WO 96/27155 | 9/1996 |
| WO | WO 97/12460 | 4/1997 |
| WO | WO 98/09209 | 3/1998 |
| WO | WO 98/10381 | 3/1998 |
| WO | WO 98/37481 | 8/1998 |
| WO | WO 99/01815 | 1/1999 |
| WO | WO 99/24928 | 5/1999 |
| WO | WO 99/48296 | 9/1999 |
| WO | WO 99/57847 | 11/1999 |
| WO | WO 00/75925 | 12/2000 |
| WO | WO 01/06374 | 1/2001 |
| WO | WO 01/09702 | 2/2001 |
| WO | WO 01/10076 | 2/2001 |

OTHER PUBLICATIONS

Advisory Action dated Jul. 18, 2007, issued in related U.S. Appl. No. 10/118,215, filed Apr. 5, 2002, Rudd.

Final Office Action dated Dec. 23, 2005 issued in related U.S. Appl. No. 10/118,215, filed Apr. 5, 2002, Ruddl.

Final Office Action dated Mar. 18, 2008, issued in related U.S. Appl. No. 10/118,215, filed Apr. 5, 2002, Rudd.

Notice of Allowance dated Apr. 13, 2009, issued in related U.S. Appl. No. 10/118,215, filed Apr. 5, 2002, Rudd.

Office Action dated Aug. 2, 2006, issued in related U.S. Appl. No. 10/118,215, filed Apr. 5, 2002, Rudd.

Office Action dated Dec. 23, 2009, issued in related U.S. Appl. No. 10/118,215, filed Apr. 5, 2002, Rudd.

Office Action dated Feb. 8, 2007, issued in related U.S. Appl. No. 10/118,215, filed Apr. 5, 2002, Rudd.

Office Action dated May 10, 2005, issued in related U.S. Appl. No. 10/118,215, filed Apr. 5, 2002, Rudd.

Office Action dated May 29, 2007 issued in related U.S. Appl. No. 10/118,215, filed Apr. 5, 2002, Rudd.

Office Action dated Oct. 16, 2007 issued in related U.S. Appl. No. 10/118,215, filed Apr. 5, 2002, Rudd.

Office Action dated Oct. 16, 2008, issued in related U.S. Appl. No. 10/118,215, filed Apr. 5, 2002, Rudd.

Sibert, O., "Systems and Methods for Using Cryptography to Protect Secure and Insecure Computing Environments," U.S. Appl. No. 09/682,692, filed Jul. 28, 2000, 77 pages.

Sibert, O., "Securing Processing Unit Systems and Methods," U.S. Appl. No. 09/643,630, filed Aug. 21, 2000, 68 pages.

Sibert, Olin, et al. "Digibox: A Self-Protecting Container for Information Commerce," Proceedings of the First USENIX Workshop on Electronic Commerce, New York, NY, Jul. 1995, pp. 1-13.

Sibert, Olin, et al., "Securing the Content. Not the Wire, for Information Commerce," InterTrust Technologies Corporation, 1996, 12 pages.

Stalder, F. et al., Exploring Policy Issues of Electronic Cash: The Mondex Case, Canadian Journal of Communication [Online], vol. 24, Issue 2, Jan. 1, 1999, 21 pages, available at htt[://www.cjc-online.ca/viewaricle.php?id=522.

Stefik, M., "Letting Loose the Light: Igniting Commerce in Electronic Publication," Internet Dreams: Archetypes, Myths, and Metaphors. Massachusetts Institute of Technology, 1996, pp. 219-253.

Stefik, M., "Trusted Systems," Scientific American, Mar. 1997, pp. 78-81.

UK ITSEC Scheme Certification Report No. P129: MONDEX Purse, Release 2.0 on MULTOS Version 3 and Hitachi H8/3112 integrated circuit card, Issue 1.0, UK IT Security Evaluation and Certification Scheme, Cheltenham, United Kingdom, Sep. 1999, 30 pages.

Jones, D., Document from the Internet: "Top Tech Stories, PowerAgent Introduces First Internet 'Informediary' to Empower and Protect Consumers," (updated Aug. 13, 1997) 3 pages.

Stefik, M., "Chapter 7, Classification," Introduction to Knowledge Systems, Morgan Kaufmann Publishers, Inc., 1995, pp. 543-607.

Stefik, M., "Letting Loose the Light: Igniting Commerce in Electronic Publication," Internet Dreams: Archetypes, Myths, and Metaphors. Massachusetts Institute of Technology, 1996, pp. 219-253.

Stefik, M., "Letting Loose the Light: Igniting Commerce in Electronic Publication," Xerox PARC, Palo Alto, CA, 1994-1995, 35 pages.

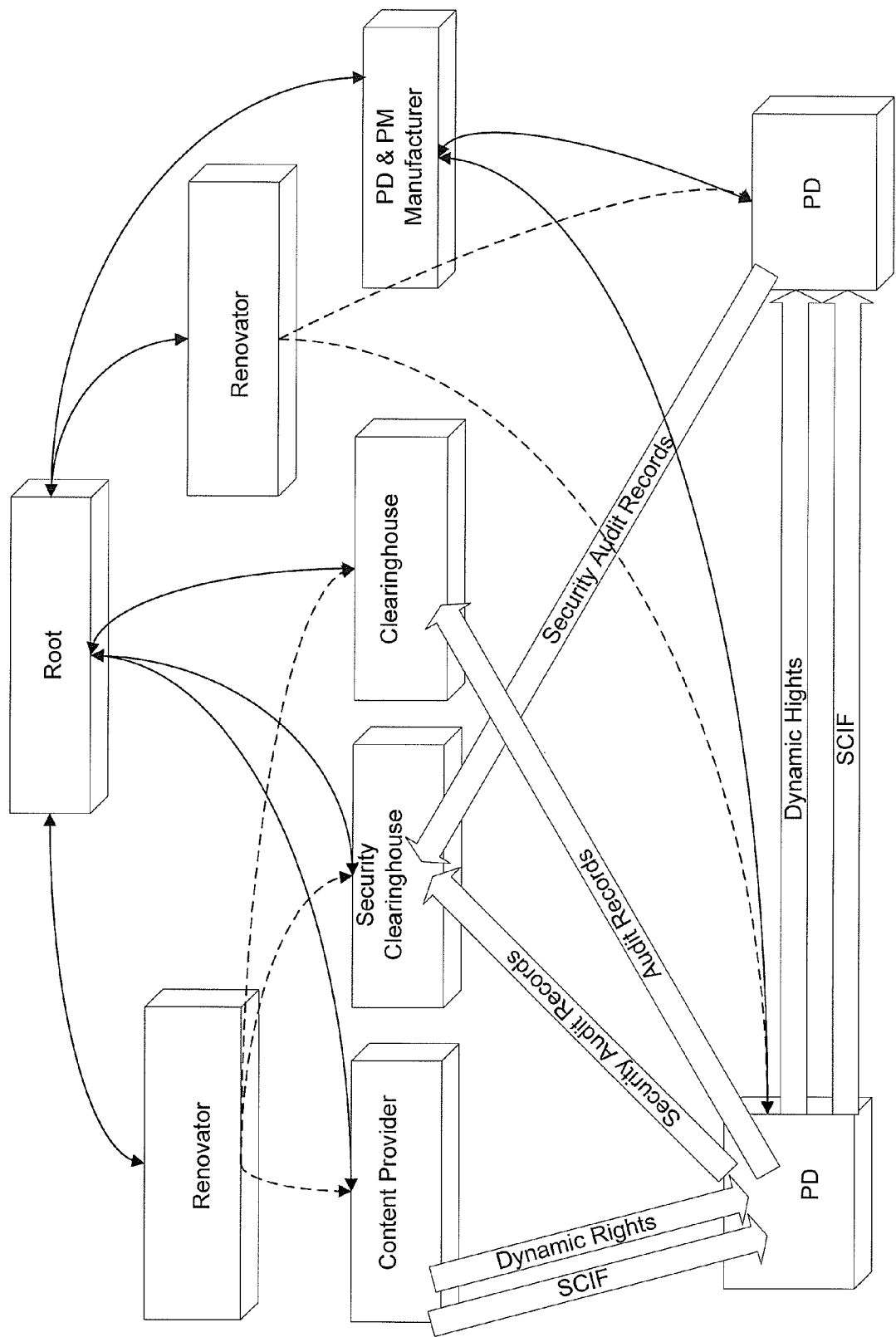
Fig A-1

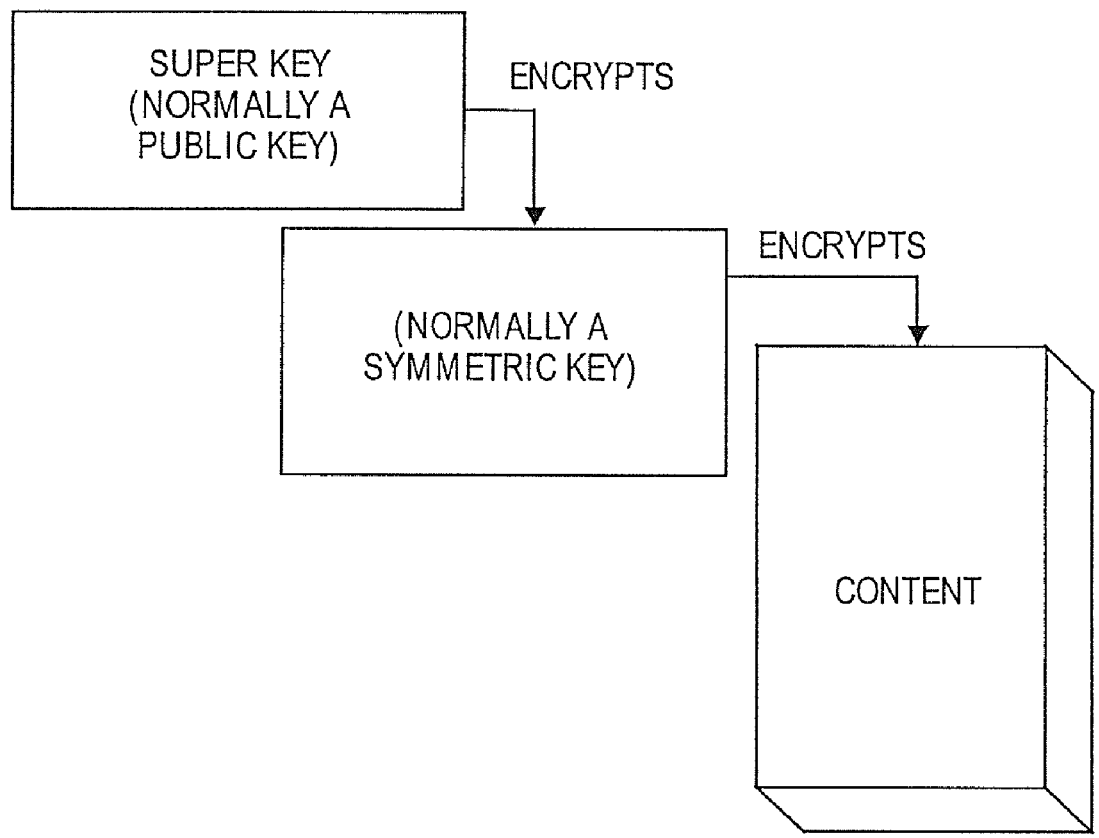
FIG. A-2

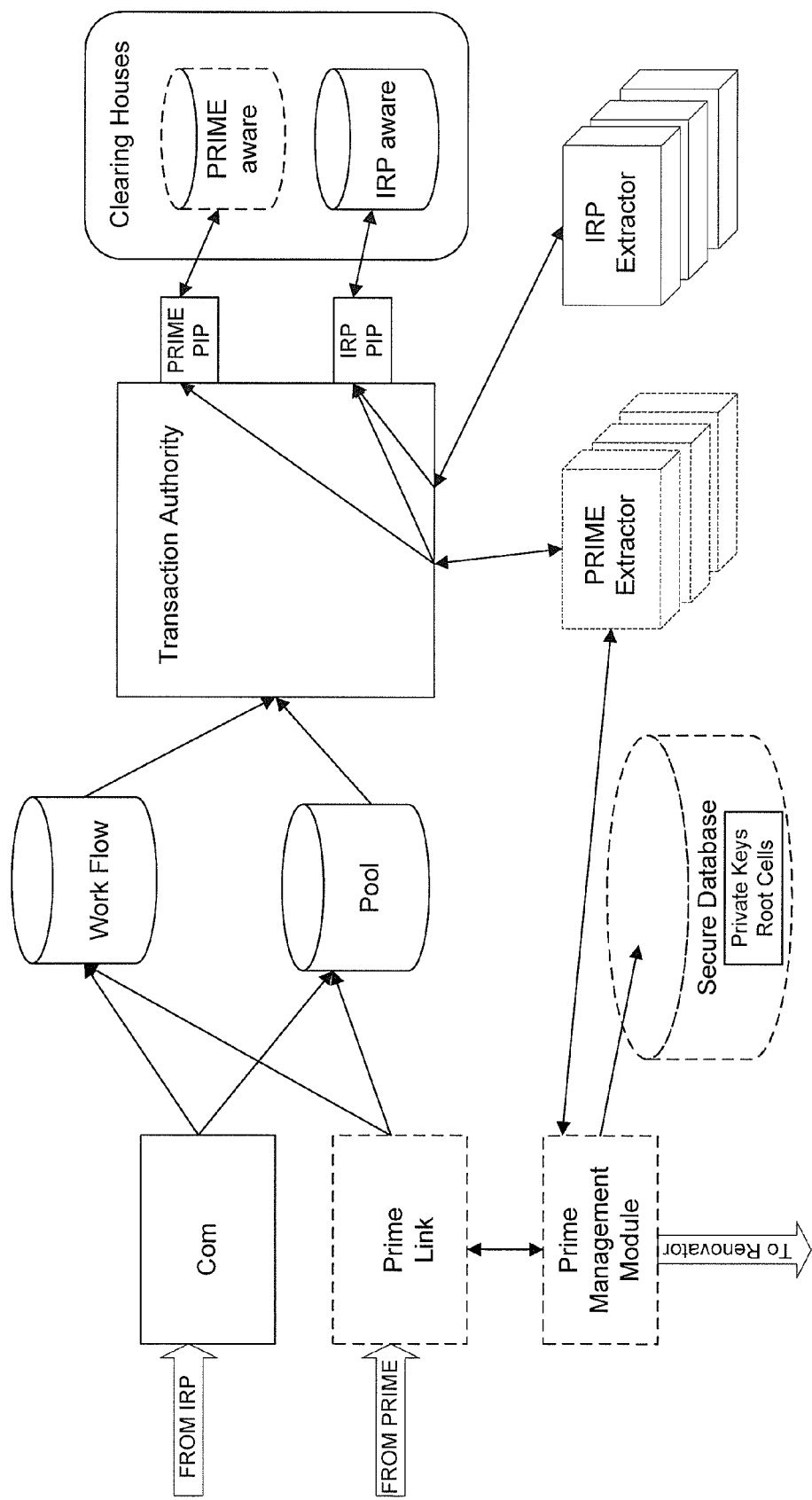
Fig. A-3

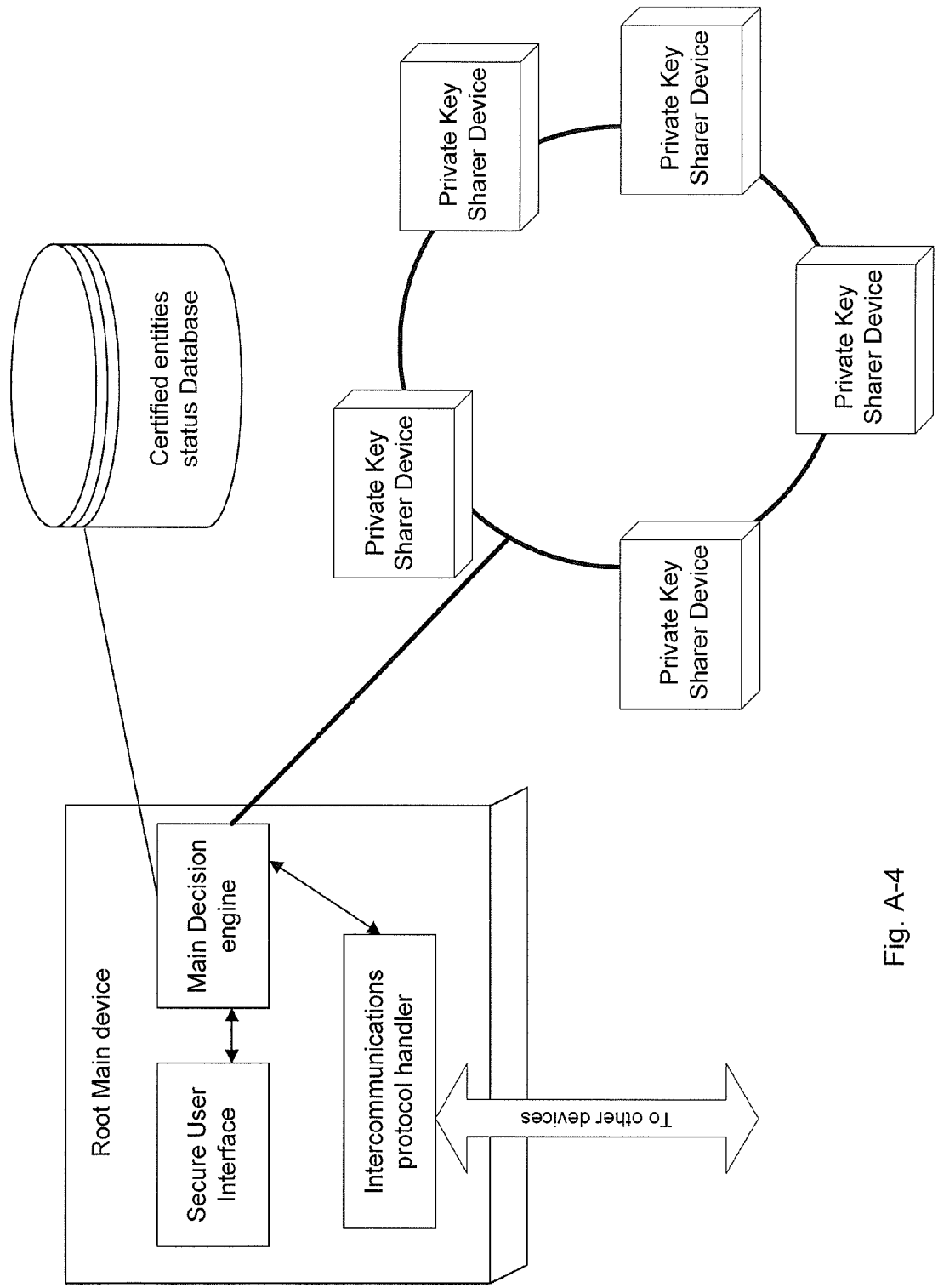
Fig. A-4

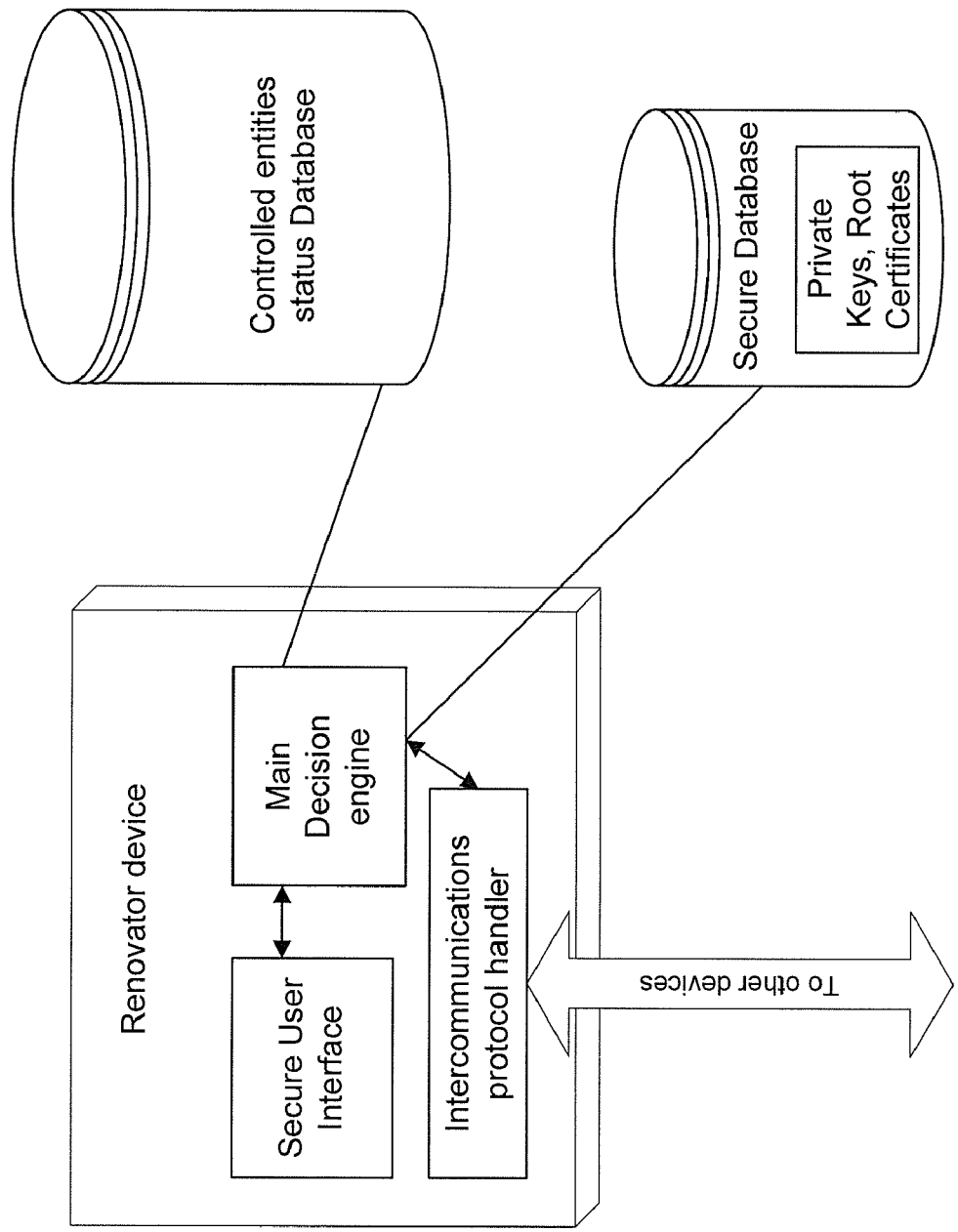
Fig. A-5

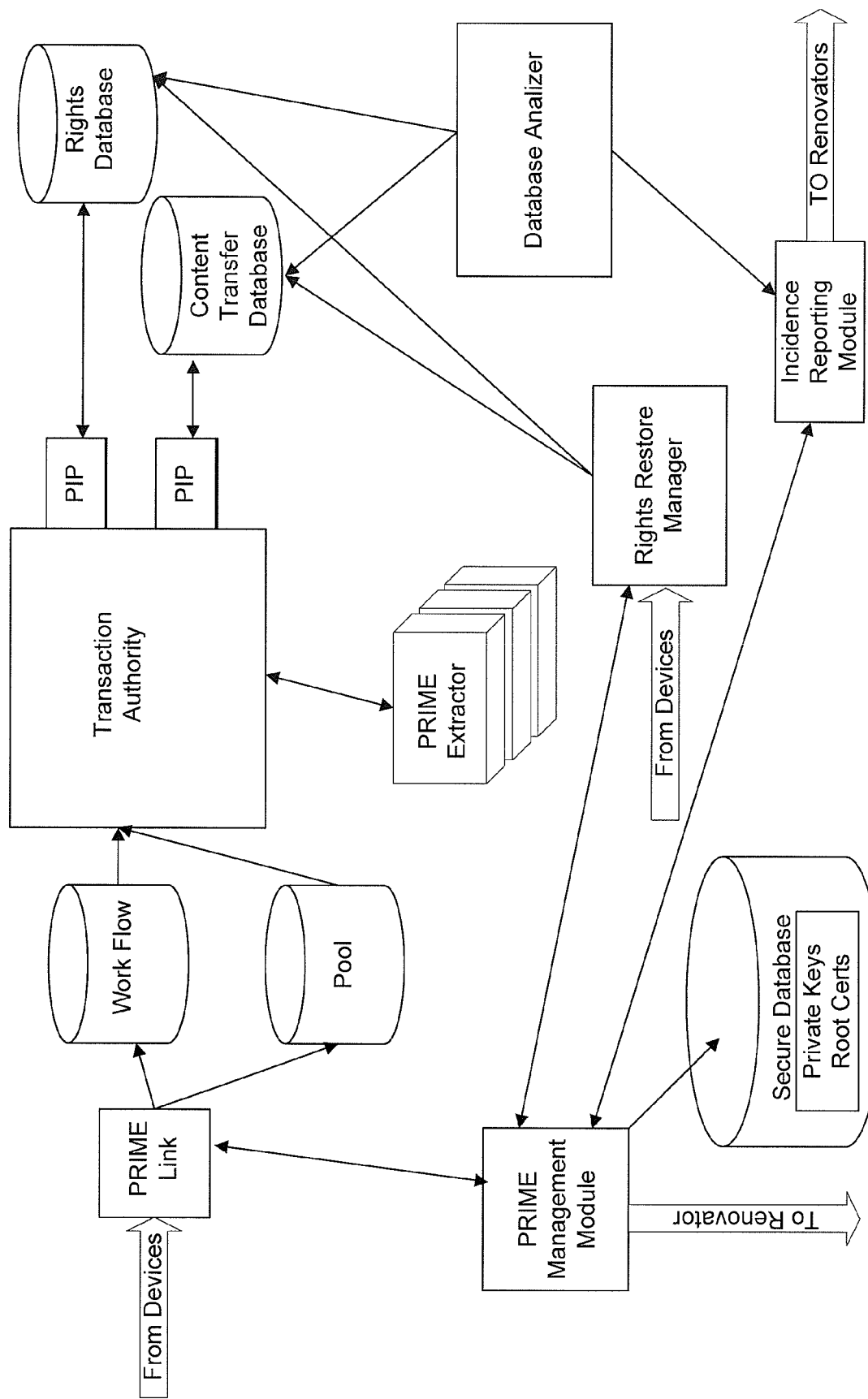
Fig. A-6

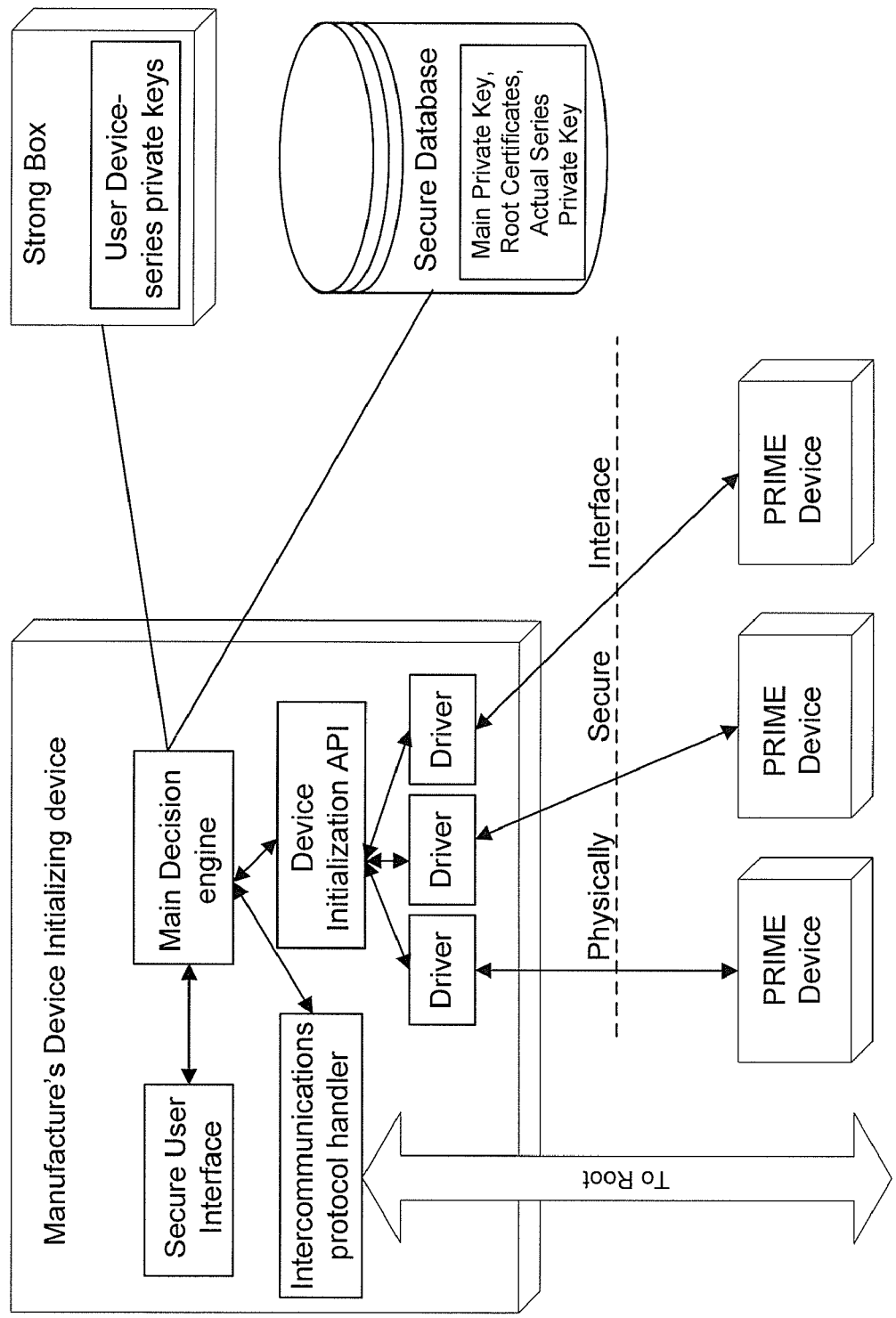
Fig. A-7

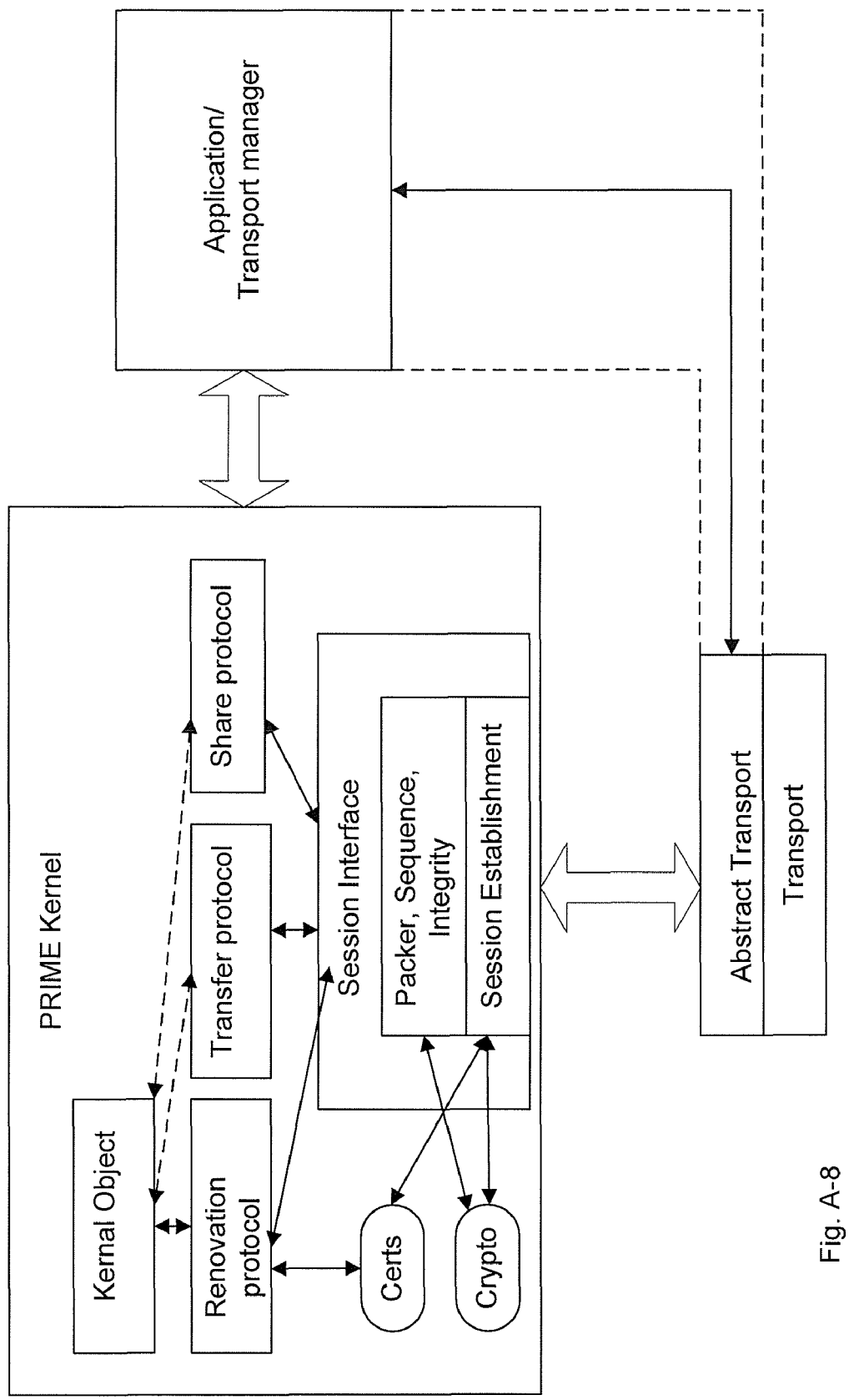
Fig. A-8

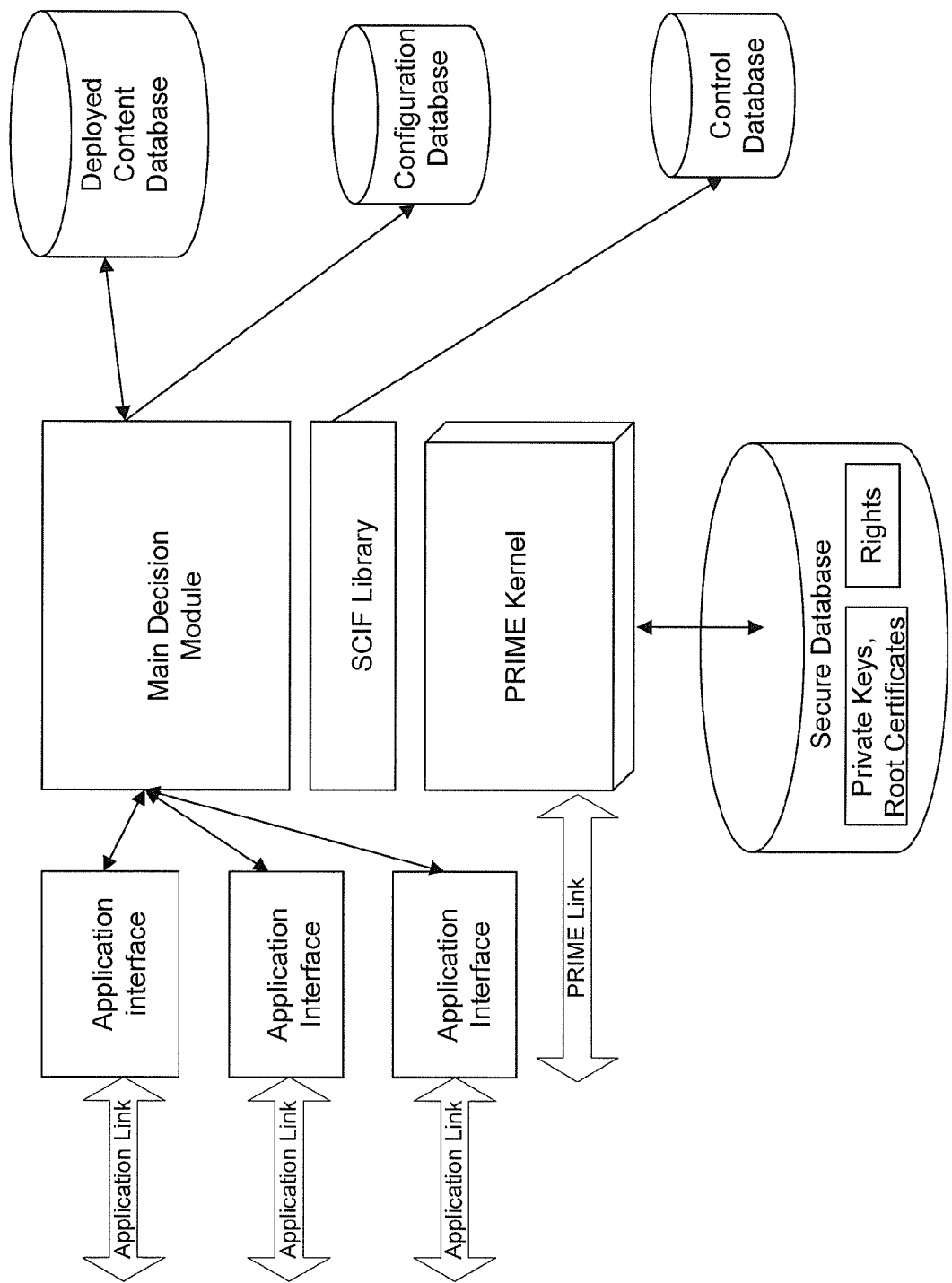
Fig. A-9

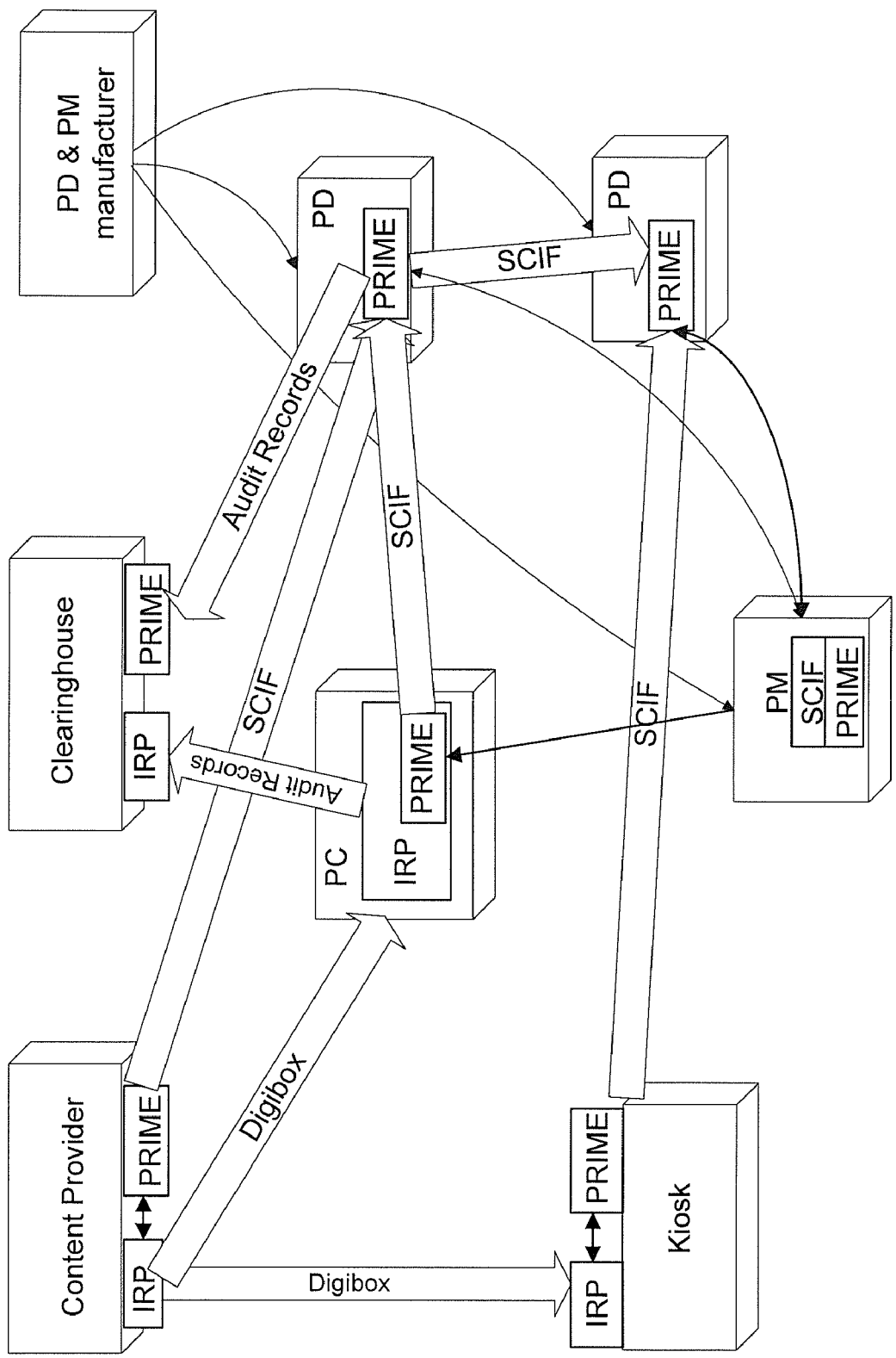
Fig. A-10

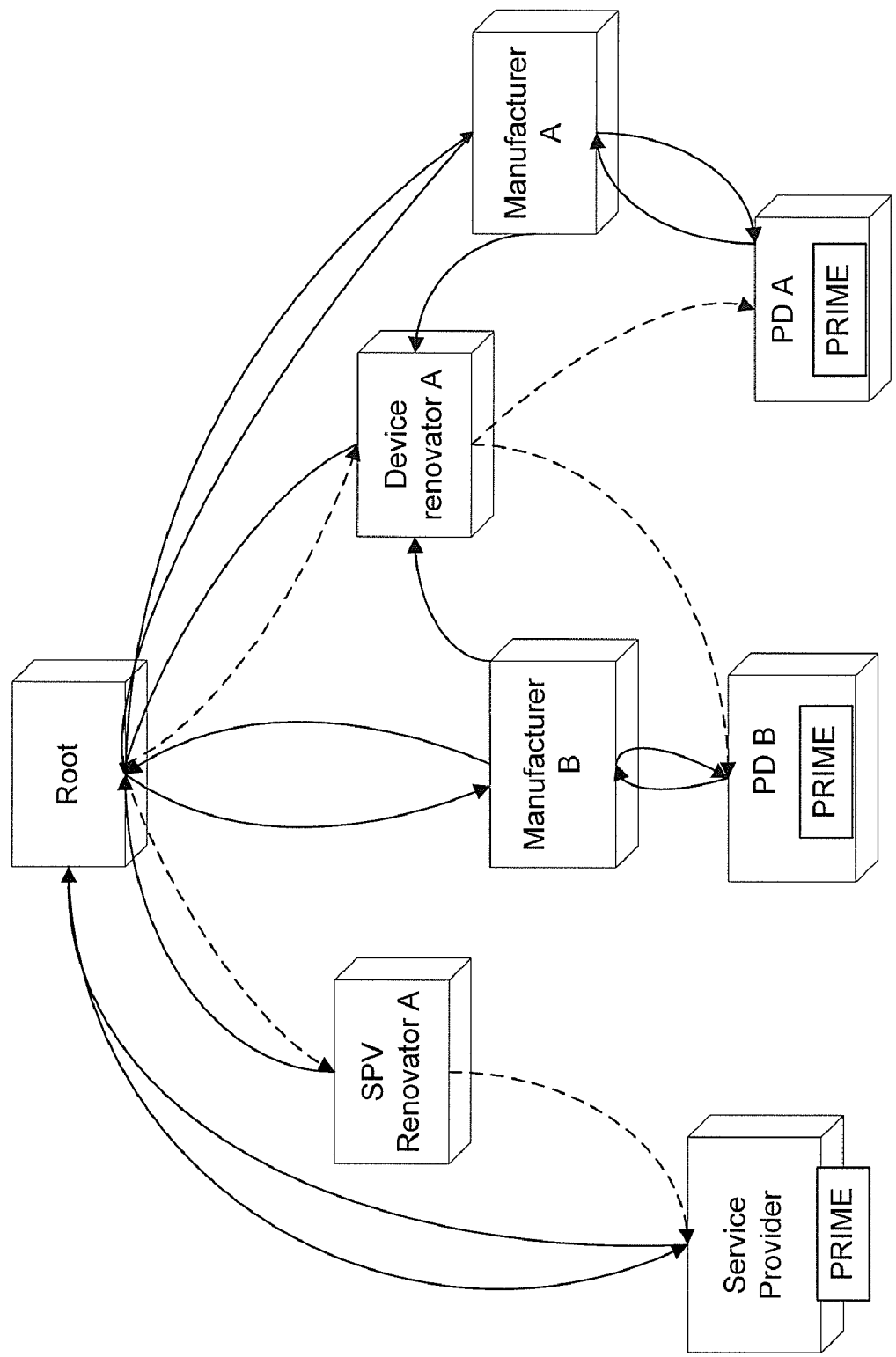
Fig. A-11

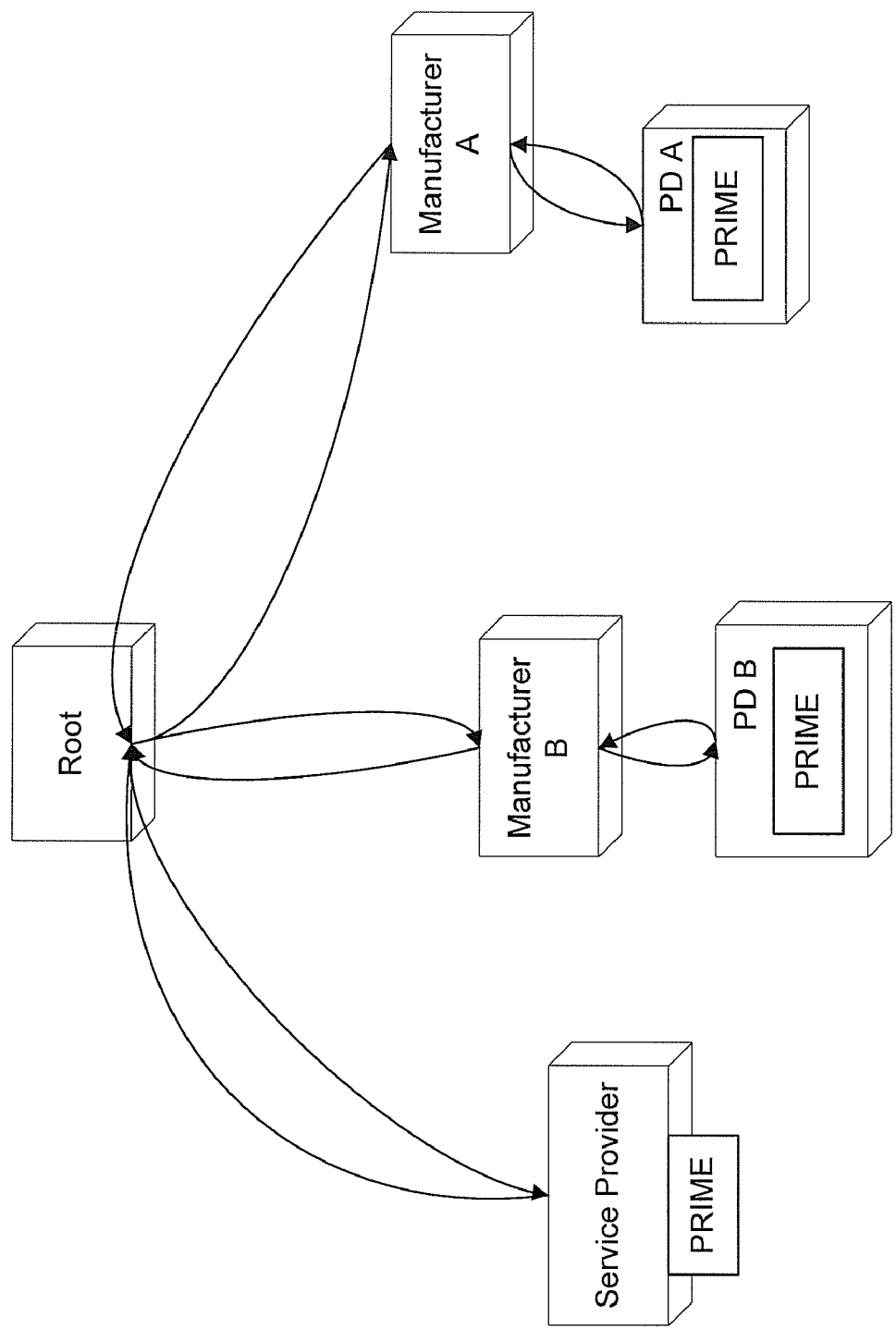
Fig. A-12

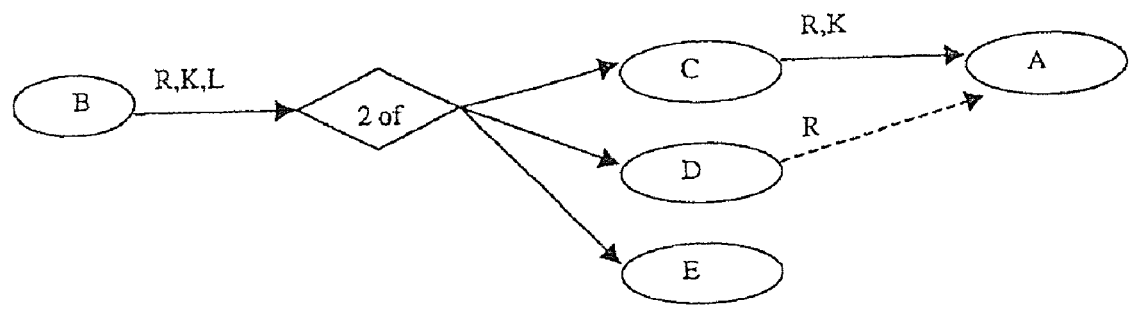
Fig. A-13

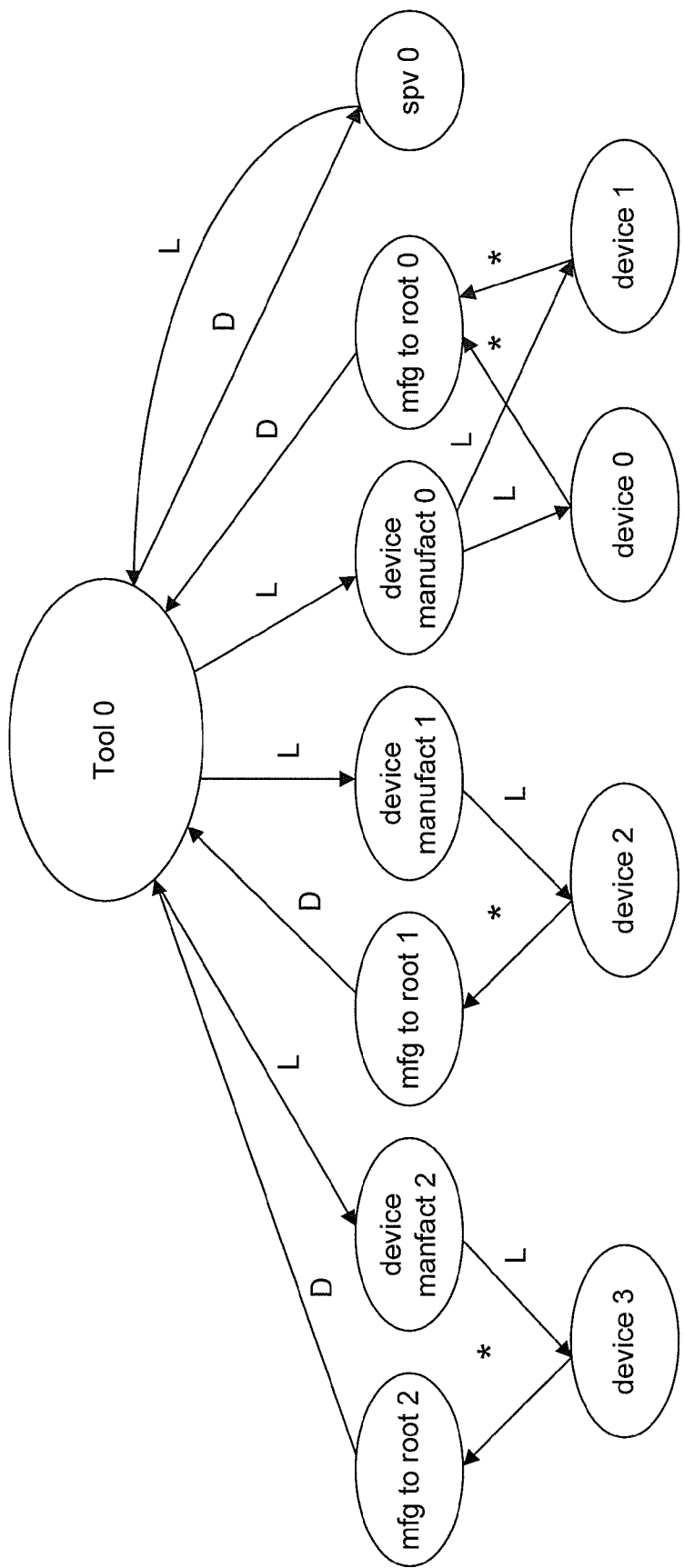
Fig. A-14

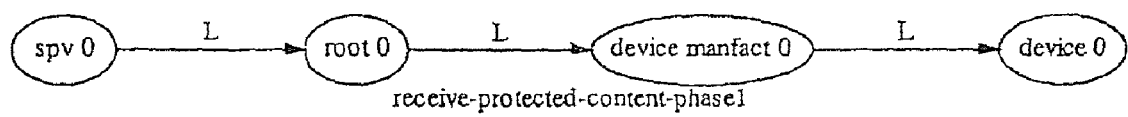
Fig. A-15

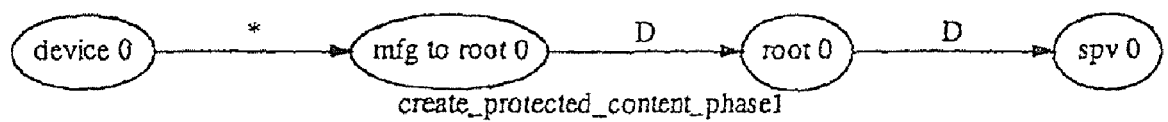
Fig. A-16

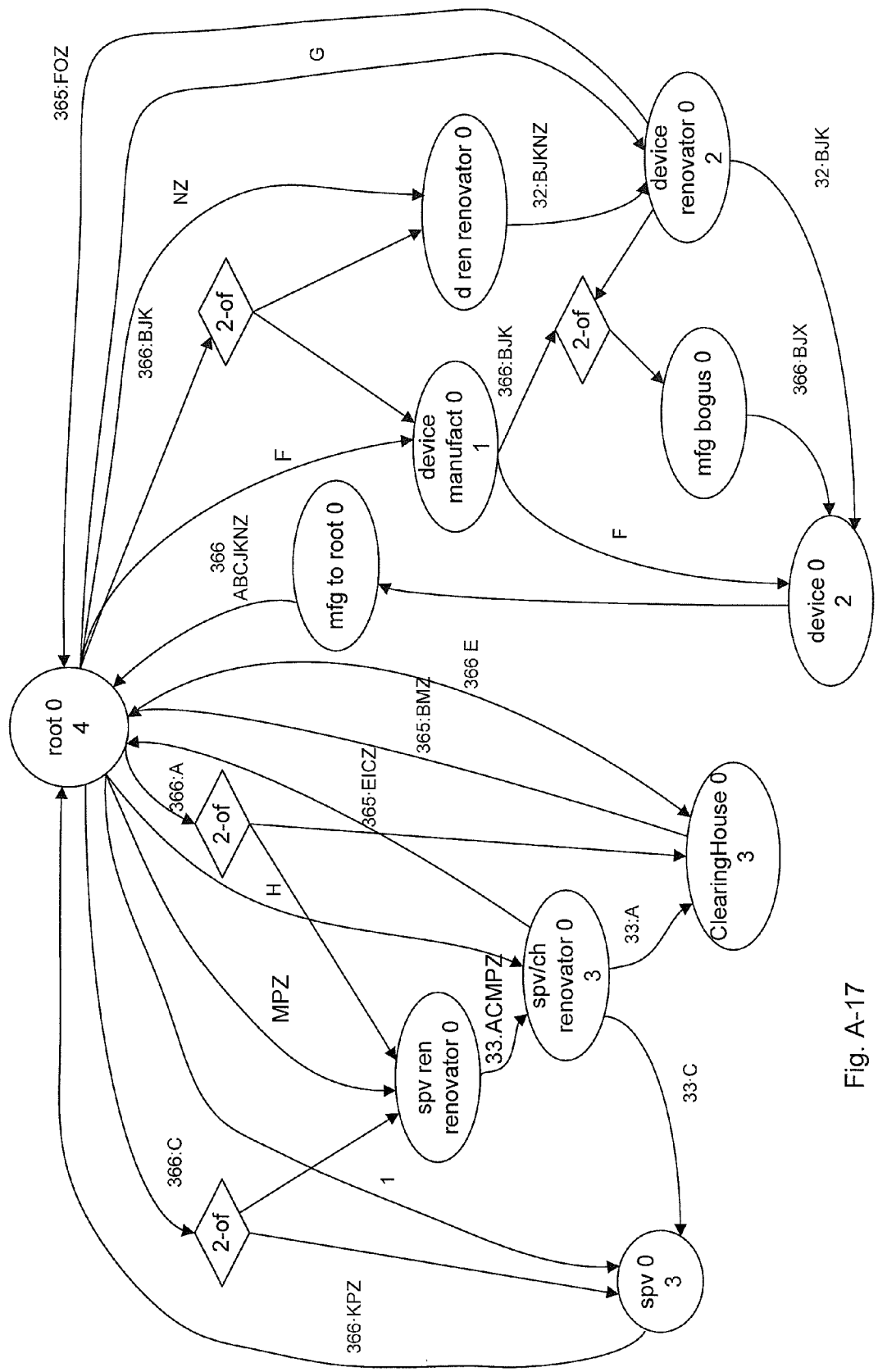
Fig. A-17

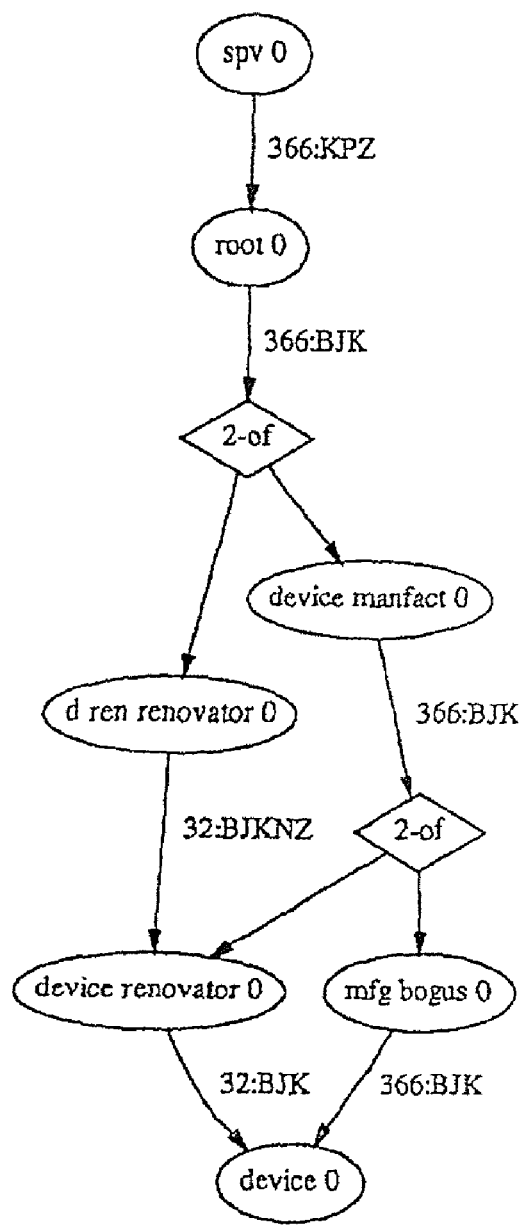
Fig. A-18

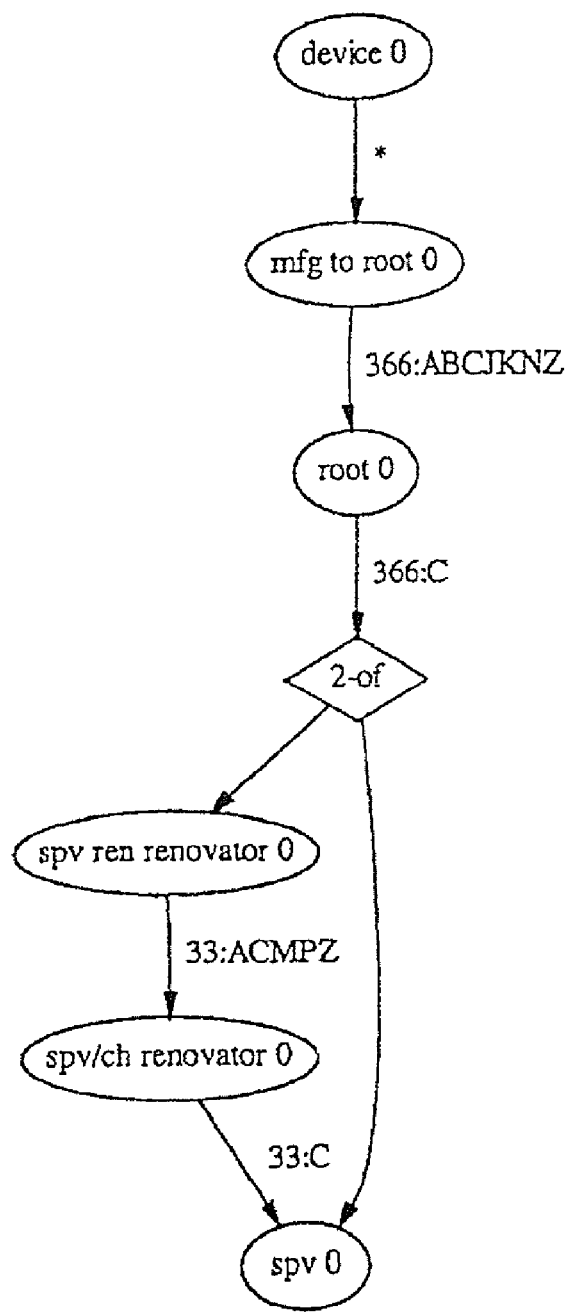
Fig. A-19

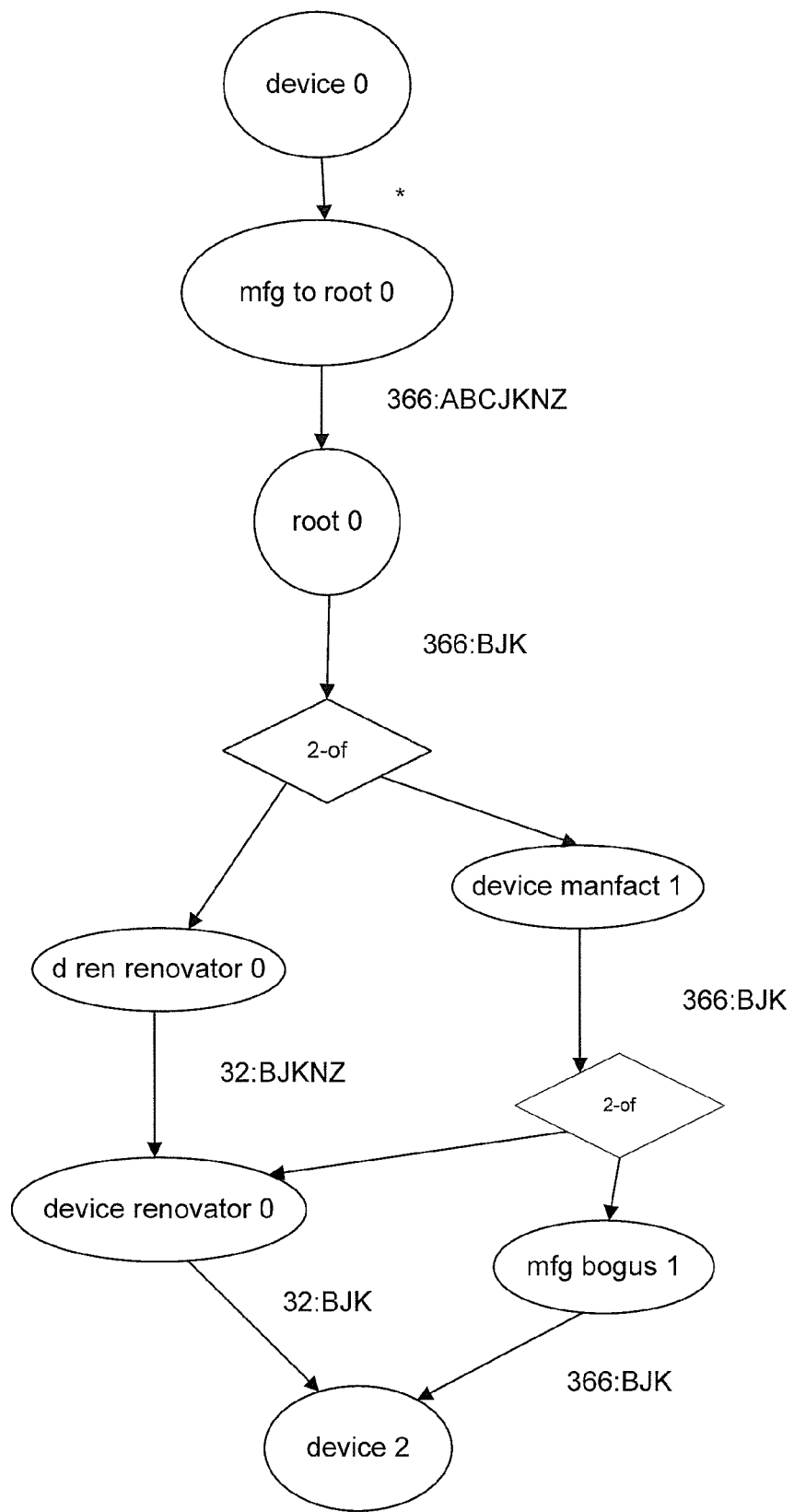
Fig. A-20

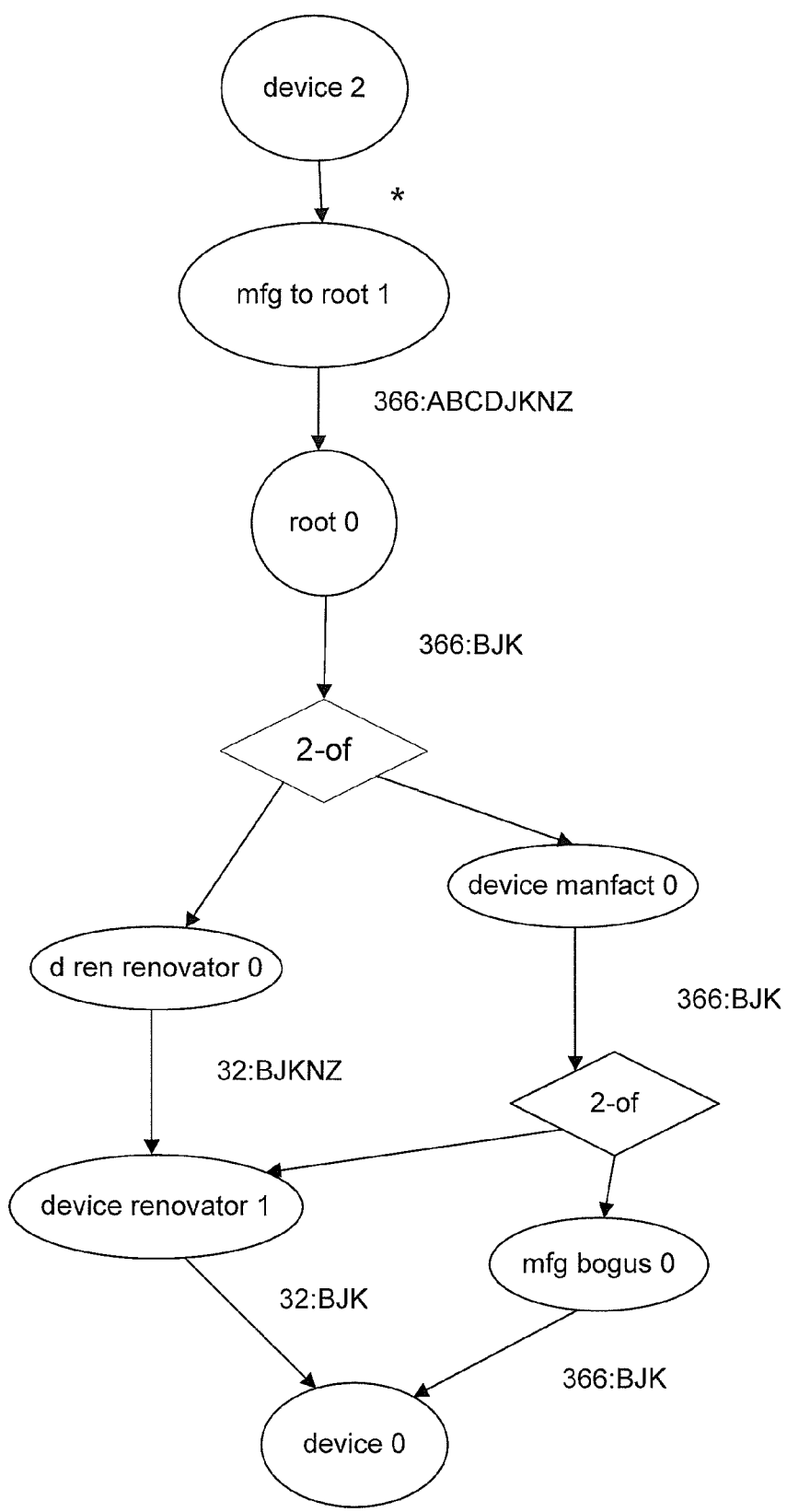
Fig. A-21

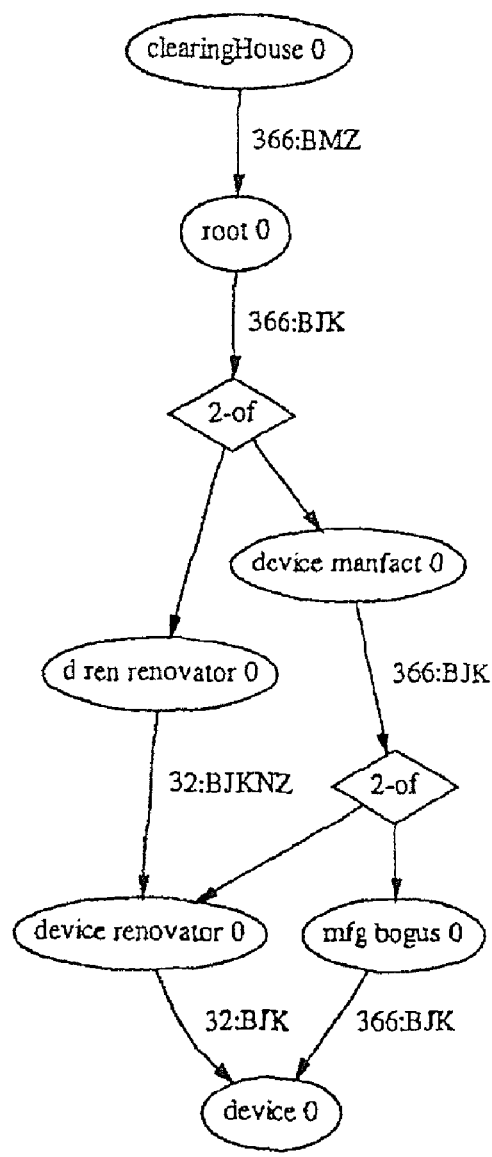
Fig. A-22

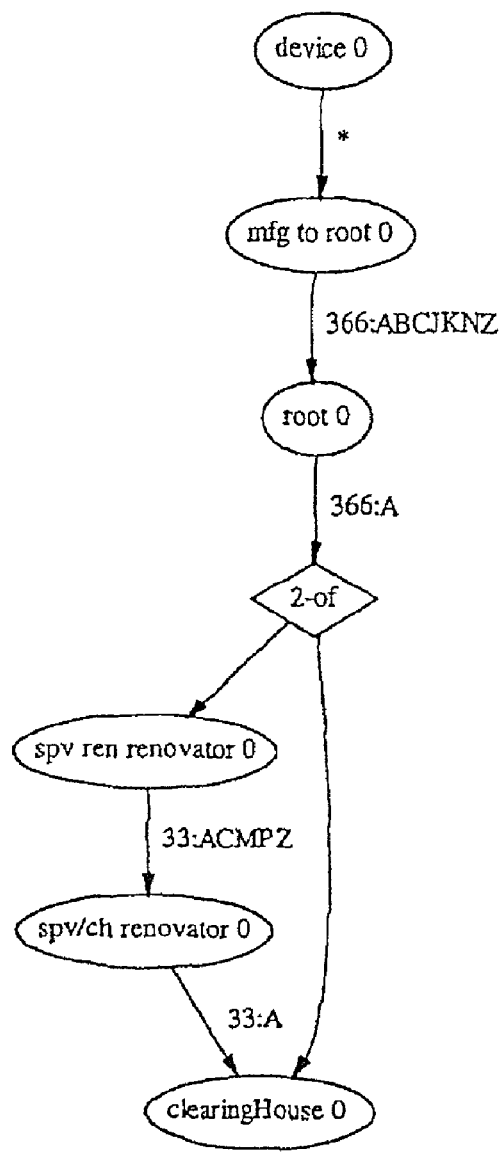
Fig. A-23

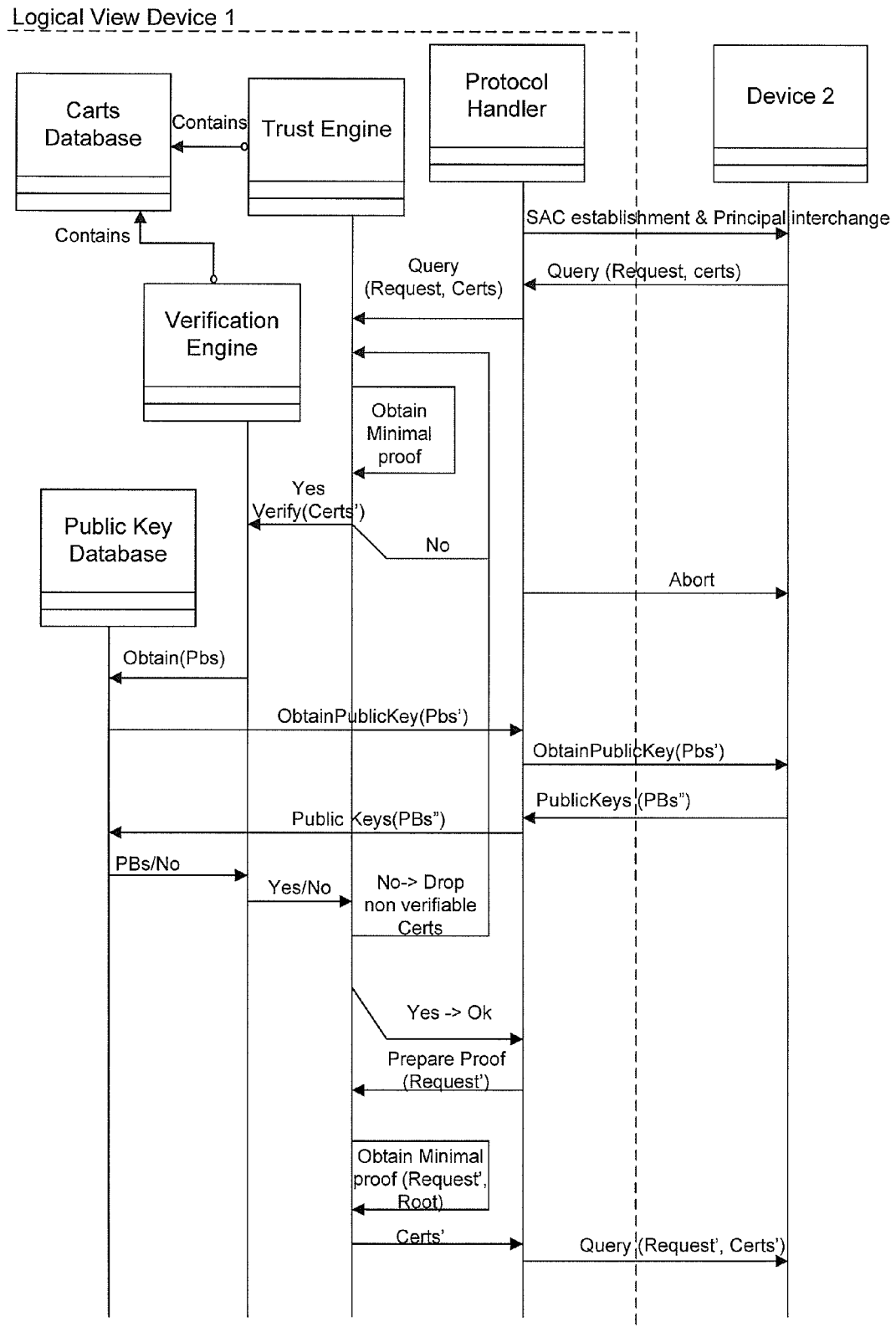
Fig. A-24

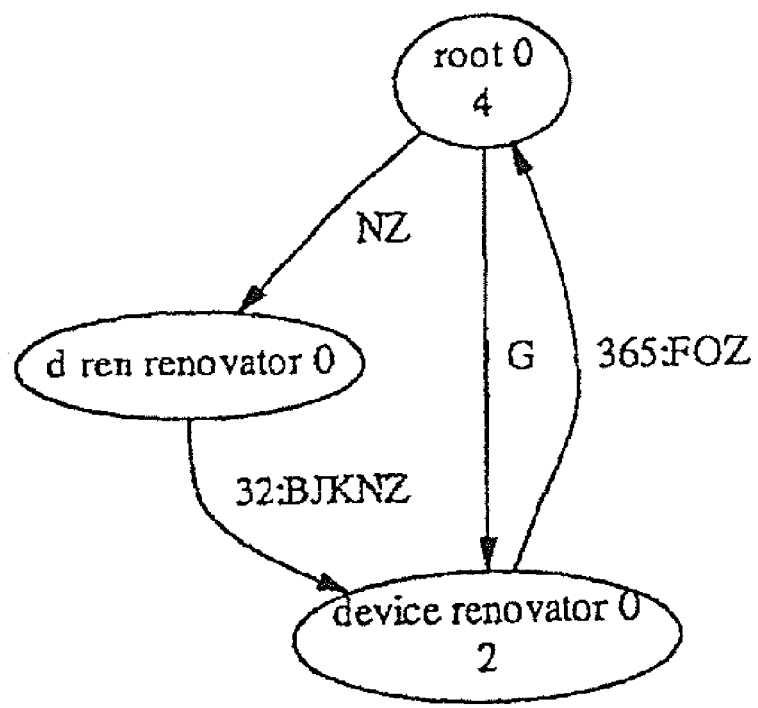
Fig. A-25

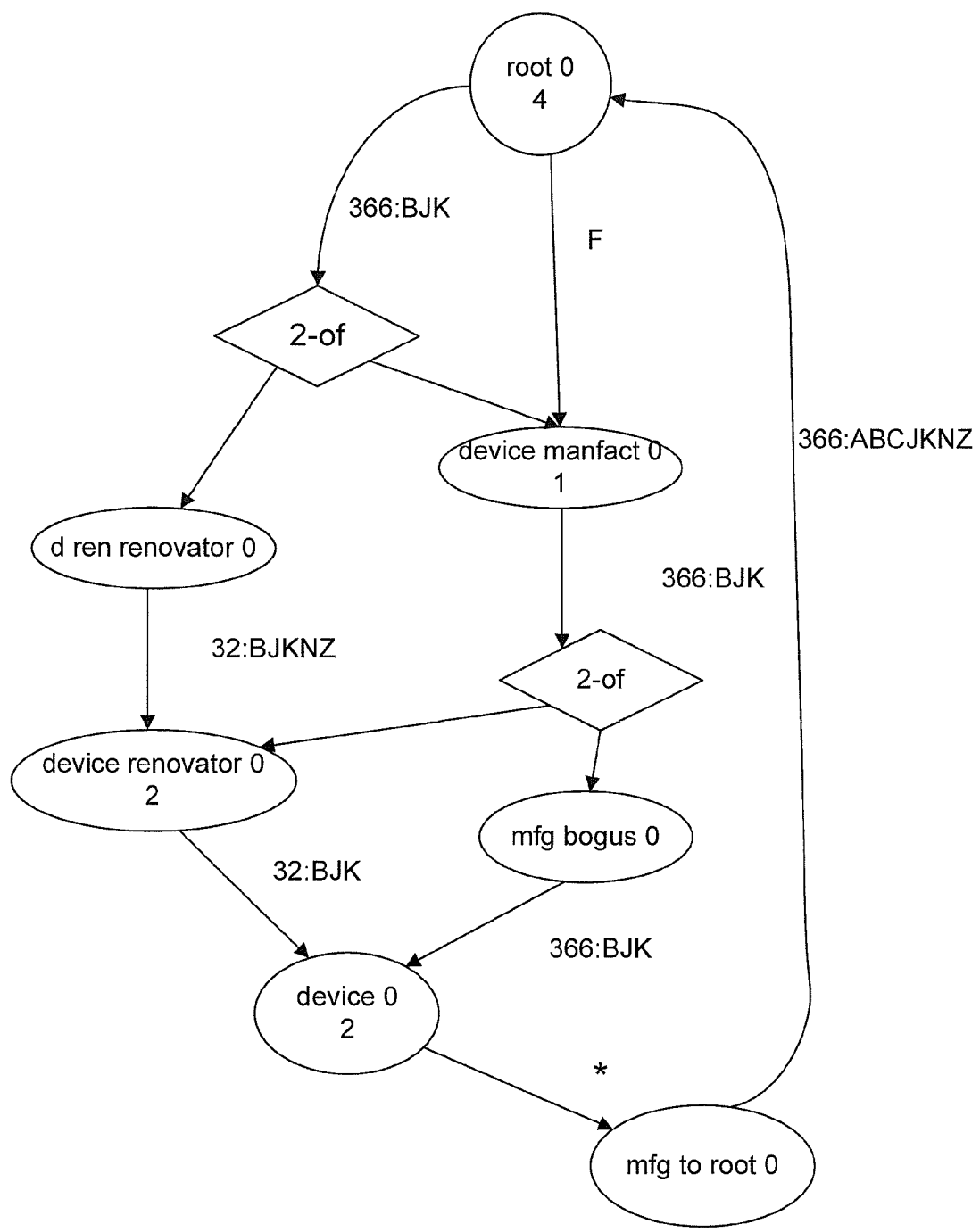
Fig. A-26

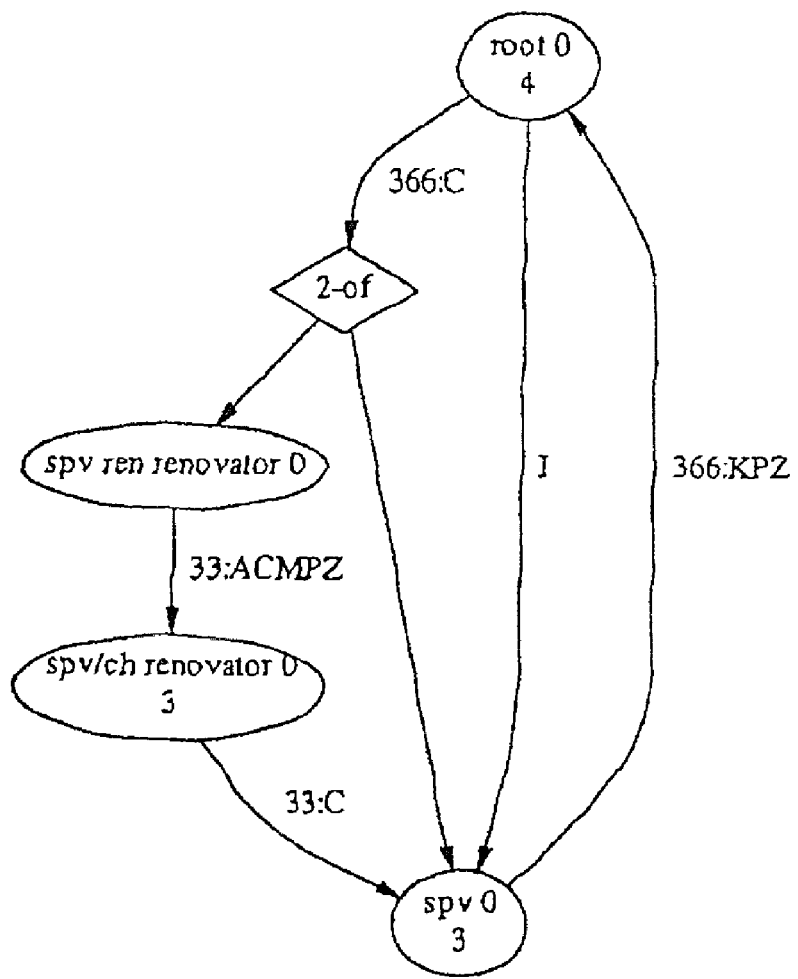
Fig. A-27

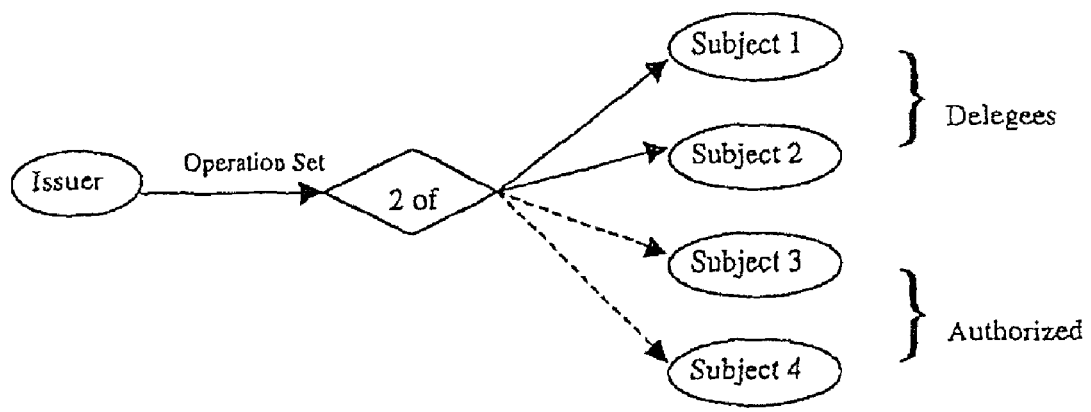
Fig. A-28

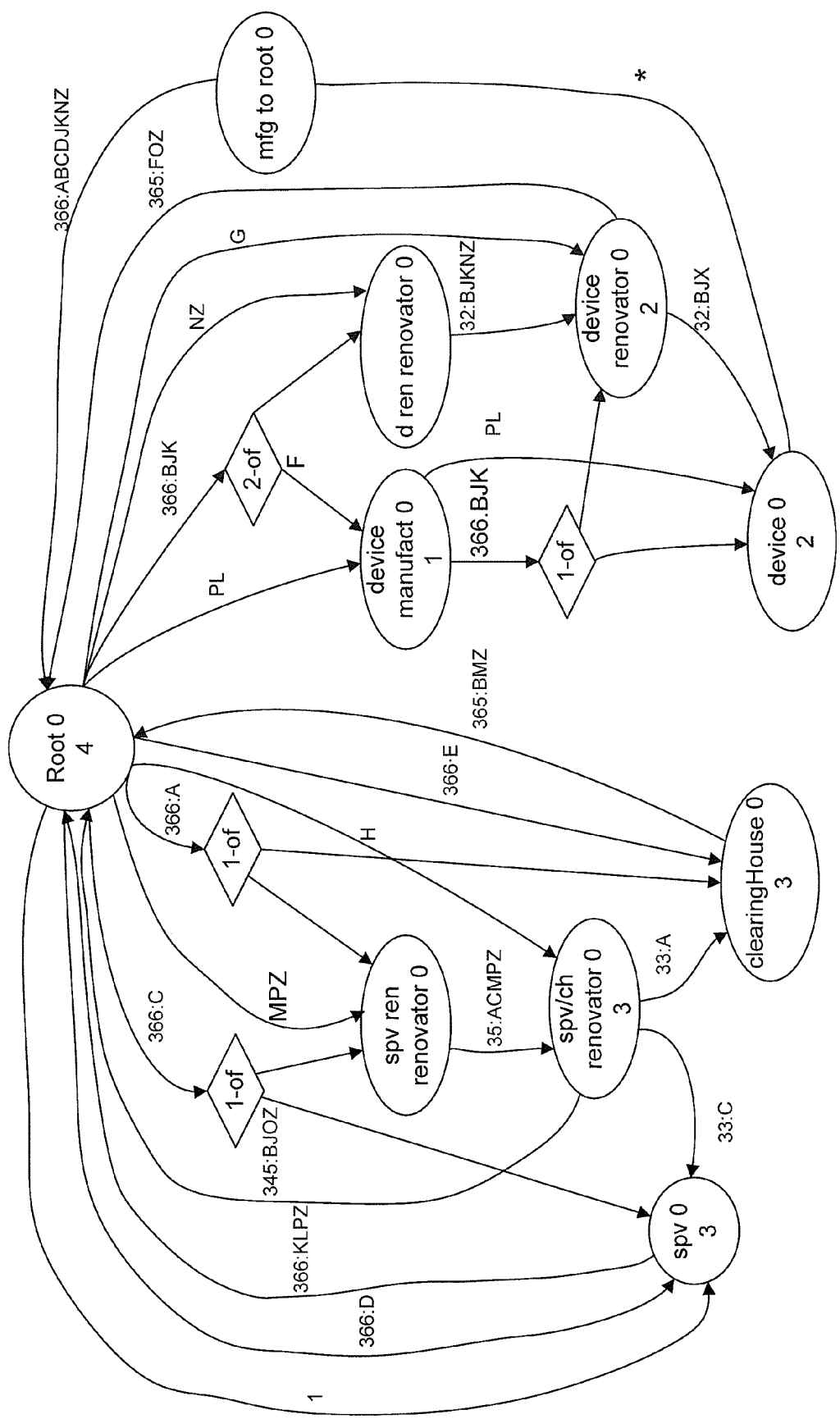
Fig. A-29

SYSTEMS AND METHODS FOR MANAGING THE DISTRIBUTION OF ELECTRONIC CONTENT

RELATED APPLICATIONS

This is a continuation of application Ser. No. 10/118,215, filed Apr. 5, 2002, now U.S. Pat. No. 7,580,988, and claims the benefit of U.S. Provisional Application No. 60/282,257 entitled "Systems and Methods for Managing the Distribution of Electronic Content," filed Apr. 5, 2001, all of which are incorporated herein by reference.

COPYRIGHT AUTHORIZATION

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention relates generally to digital rights management. More specifically, systems and methods are disclosed for controlling the distribution or use of an electronic work. The present invention uses unique protocols for the transfer of electronic information so that original works can be transferred from one location to another in such a way that only one original work exists at a given time. This type of implementation allows for peer-to-peer distribution of originals without requiring a registration authority with centralized back-end servers to vouch for what constitutes an "original" piece of information, thus reducing (or eliminating entirely) the need to centrally record changes in ownership each time originals change hands.

BACKGROUND OF THE INVENTION

An original physical document can be distinguished from a copy by examining the paper stock, holographic characteristics of the printing, or by latent markings that appear when a document is photocopied. In contrast, it is commonly thought that a distinction cannot be readily drawn between an original electronic document and a copy, since a copy of an electronic document is typically an exact duplicate.

Distinguishing an original from a copy is important when the original has a characteristic, property, or value that a copy of the original does not. For example, bearer instruments or bearer bonds are documents that uniquely entitle the owner of the document to value or property. Because bearer bonds are not registered or tracked in the name of any individual, it is impossible to replace them should they become lost or stolen. In that respect, bearer bonds are similar to cash, and can be redeemed by anyone who has physical possession of the bond. Therefore, a copy of a bearer instrument is typically worth very little, since it does not entitle its owner to the value or property to which the owner of the original bearer instrument is entitled. In addition, "pink slips" to automobiles and original deeds of trust entitle the owners of such documents to possession of certain types of property, namely real estate and automobiles, respectively. If an individual would like to purchase real estate or a car, he or she would probably feel uncomfortable conducting a transaction without proof that the alleged owner was in receipt of such title documents. Therefore, the ability to produce original documentation of ownership can be extremely important.

In some situations, an original document may not be needed. One such example would be a contract that is equally enforceable regardless of whether the party demanding performance produces the original signed document or a photocopy. Another example is the situation in which proving the authenticity of an electronic version of a document is sufficient to demand enforcement. However, if each party claims to have a copy of the "original," but there are substantive differences between these copies, then the ability to produce or identify the actual original would be helpful in reconciling these differences.

SUMMARY OF THE INVENTION

The systems and methods of the present invention allow for originals to change owners, but in a preferred embodiment these trades result in a zero sum of new originals. The systems and methods of the present invention can allow for original electronic information to be processed within an automated workflow process. For example, if a corporation wants to secure a loan from a commercial bank with a bearer bond that it holds, the corporation would typically need to turn over the bond to the bank, which would then hold the bond in custody as collateral until the loan was paid back. Embodiments of the present invention would allow the corporation to electronically transfer the bond to the bank in a manner that would result in the bank having the original bearer bond and not the corporation. The reverse would occur when the loan was paid back. A similar process could be used when an owner of an electronic bearer bond simply wished to place it in another location for safer keeping. For example, if a bank offered an electronic safety deposit box akin to the boxes in a physical branch vault, a bank customer might transfer an electronic bearer bond from a personal computer at home into the bank's electronic safety deposit box. As another example, as computing equipment ages or changes, a person may wish to transfer original documents, music, ebooks, movies, software applications or any other type of electronic file from one computer to another.

The systems and methods of the present invention can accommodate single or multiple originals (or what might also or alternatively be referred to as "masters" or "restricted copies"). Currency, although generally serialized, is an example in which multiple instances of the genuine originals exist that must be distinguished from counterfeit copies. The systems and methods of the present invention allow for originals to change owners, but in a preferred embodiment these trades result in a zero sum of originals. This type of implementation allows for peer-to-peer distribution of originals without requiring a registrar authority with a centralized back-end server to vouch for what is an "original" and what is not, and to record in its records a change in ownership each time an original changes hands.

Systems and methods are provided for enabling a determination to be made of whether an electronic document is an original or a copy. Electronic books, music, documents, and any form of digital content can be transferred without creating more than one original. It should be appreciated that the present invention can be implemented in numerous ways, including as a process, an apparatus, a system, a device, a method, or a computer readable medium. In addition, the present invention may be provided as a computer program product, which may include a machine-readable medium having stored thereon instructions that may be used to program a computer (or other electronic device) to perform a process according to the present invention. The machine-readable medium may include, but is not limited to, a floppy diskette, optical disk, CD-ROM, magneto-optical disk, ROM, RAM, EPROM, EEPROM, magnetic or optical cards, or other type of media/machine-readable medium suitable for storing electronic instructions. Furthermore, the present invention may also be downloaded as a computer program product, wherein the program may be transferred from a remote computer (e.g., a server) to a local computer (e.g., a client) by way of data signals embodied in a carrier wave or other propagation medium via a communication link (e.g., a modem or network connection). Several inventive embodiments of the present invention are described below.

In one embodiment, a method is provided for distributing an original electronic work in a manner that ensures that, at most, only a predetermined number of instances of the original electronic work are in existence at any given time. In one embodiment, the predetermined number is equal to one. When a first system requests the electronic work from a second system, the second system sends a copy of the electronic work to the first system. A cryptographic protocol is then employed to mark the second system's copy of the electronic work as a copy, and to mark the first system's copy of the electronic work as the original. In one embodiment, marking a work as a copy might affect how the work is rendered, such as having "copy" appear on the screen in the case of a document, or preventing the bearer of a copy from performing a "transfer original" transaction since the bearer's system does not hold an original and, therefore, should not be able to transfer one.

In one embodiment, an interruption of the cryptographic protocol may result in neither system having the original electronic work (i.e., both systems may be deemed to have copies of the electronic work). A cryptographically enabled failure recovery mechanism can be used to determine that a system event caused the protocol to not complete, resulting in both documents being marked as copies. If the recovery mechanism determined that the original was lost, a new original could be authorized to be created, or one of the copies of the electronic work could be marked as the original, based upon predetermined criterion. In one embodiment, only certain predefined parties (e.g., an issuing authority) have the ability to create an original or a new original and to verify information from the recovery mechanism to determine that an original was in fact lost. The above mechanism would still allow other parties the ability to transfer an original to another party. In this embodiment, the issuing authority would verify the original was lost, create a new original, and transfer on behalf of the first sender the newly created original to the intended recipient.

In another embodiment, a method is provided for distributing an electronic work in a manner that ensures that, at most, only a predefined number of instances of the electronic work will be deemed to be originals. A first system requests one of the originals from a second system. The two systems authenticate each other. In a preferred embodiment an aspect of the authentication process is to ensure that the second system has an original to transfer and that the first system has the ability to protect the integrity of the original in a manner equivalent to the second system. The second system sends a copy of the electronic work to the first system. Upon receipt of the copy, the first system sends an authorization to the second system. Upon receipt of the authorization, the second system changes an attribute associated with its instance of the requested electronic work to indicate that it is a copy, not an original. The second system then sends an authorization to the first system. Upon receipt of the authorization, the first system changes an attribute associated with its instance of the received electronic work to indicate that it is an original, not a copy. The first system then sends an acknowledgement to the second system. In one embodiment, the first system considers the protocol complete once it has sent the acknowledgment to the second system, and the second system considers the protocol complete once it has received the acknowledgement from the first system. If either system determines (e.g., based on a predetermined criteria such as time) that a request to perform another transaction, and/or the protocol itself, has failed, it records this determination in a cryptographically signed event record, which it forwards to an authority responsible for administrating the recovery mechanism. In one embodiment, protocol failures that occur before the second system marks its version as a copy and after the first system marks its version as an original will not cause the original to be lost.

In yet another embodiment, a method is provided for ensuring that only a single instance of an electronic work is present in a system at any given time, the electronic work being comprised of some amount of electronic content and one or more rights or attributes associated with the content. When the electronic work is transferred from one system to another, only one system will possess the electronic work in its entirety at any given time, although more than one system may possess some subset of the electronic work's component parts. For example, more than one system may possess some or all of the electronic content included in the electronic work, but not the entire set of rights and/or attributes associated therewith.

These and other features and advantages of the present invention will be presented in more detail in the following detailed description and the accompanying figures which illustrate by way of example the principles of the invention.

BRIEF DESCRIPTION OF THE DRAWINGS

The present invention will be readily understood by referring to the following detailed description in conjunction with the accompanying drawings, wherein like reference numerals designate like structural elements, and in which.

Figure 1A:
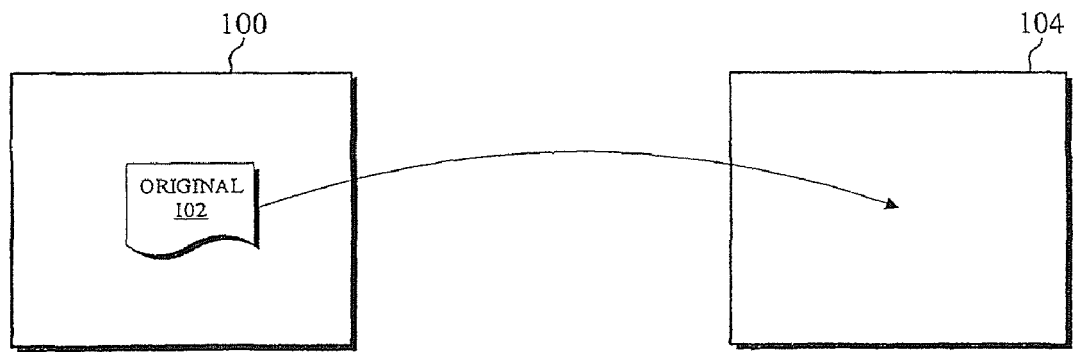
FIGS. 1A, 1B, and 1C illustrate the distribution of an electronic work in accordance with an embodiment of the present invention.

FIG. A-1 in the appendix illustrates the architecture of a security domain in an embodiment of the present invention.

FIG. A-2 in the appendix illustrates the use of multiple levels of keys.

FIG. A-3 illustrates the architecture of an exemplary clearinghouse in accordance with an embodiment of the present invention.

FIG. A-4 in the appendix depicts the architecture of the Root in accordance with an embodiment of the present invention.

FIG. A-5 in the appendix is an illustration of a Renovator's architecture in accordance with an embodiment of the present invention.

FIG. A-6 in the appendix illustrates the structure of a Security Clearinghouse in accordance with an embodiment of the present invention.

FIG. A-7 in the appendix depicts certain modules of the security kernel.

FIG. A-8 in the appendix depicts certain modules of the security kernel.

FIG. A-9 in the appendix illustrates the structure of a Content Provider Module in accordance with an embodiment of the present invention.

FIG. A-10 in the appendix illustrates the operation of a system that uses the certificate structure of the present invention.

FIG. A-11 in the appendix illustrates an embodiment of a security infrastructure.

FIG. A-12 in the appendix illustrates another embodiment of a security infrastructure.

FIG. A-13 in the appendix is an example of a graph authorizing the principal A to perform operation R in B's domain of operation.

FIG. A-14 in the appendix depicts a certificate infrastructure.

FIG. A-15 in the appendix depicts a sub-graph of the process of the Content provider evaluating eligibility of a Device for receiving content.

FIG. A-16 in the appendix is an example of a sub-graph that enables a Device to evaluate a Content provider.

FIG. A-17 in the appendix illustrates the various certificates involved in a phase 2 scenario.

FIG. A-18 in the appendix depicts the set of certificates involved in a proof.

FIG. A-19 in the appendix depicts the set of certificates involved in another proof.

FIG. A-20 in the appendix depicts the set of certificates involved in yet another proof.

FIG. A-21 in the appendix depicts the set of certificates involved in yet another proof.

FIG. A-22 in the appendix depicts the set of certificates involved in yet another proof.

FIG. A-23 in the appendix depicts the set of certificates involved in yet another proof.

FIG. A-24 in the appendix depicts an authorization network protocol.

FIG. A-25 in the appendix depicts the certificates that a Renovator D holds after being renovated by the Root.

FIG. A-26 in the appendix depicts the certificates held by a Device after being renovated.

FIG. A-27 in the appendix depicts the certificates held by a Content provider after being renovated.

FIG. A-28 in the appendix depicts a delegation construct.

FIG. A-29 in the appendix shows an alternate certificate layout for phase 2.

DETAILED DESCRIPTION

A detailed description of the invention is provided below. While the invention is described in conjunction with several embodiments, it should be understood that the invention is not limited to any one embodiment, but instead encompasses numerous alternatives, modifications, and equivalents. For example, while embodiments are described in the context of a system and method for controlling the distribution of electronic documents such as deeds, titles, and bearer instruments, those skilled in the art will recognize that the disclosed systems and methods are readily adaptable for broader application. For example, without limitation, the present invention could be readily applied in the context of distributing virtually any type of digital or electronic work, such as digital music, recordings, books, movies, videos, digital entitlements and the like (and the term "document," as used herein, should be interpreted to apply to any of these as well as other types of digital or electronic works, unless otherwise clear from the context). In addition, while numerous specific details are set forth in the following description in order to provide a thorough understanding of the present invention, the present invention may be practiced without some or all of these details. Moreover, for the purpose of clarity, certain technical material that is known in the art related to the invention has not been described in detail in order to avoid unnecessarily obscuring the present invention.

The discussion that follows will describe how the properties that characterize an electronic work as an original can travel with it as it is transferred from one storage medium to another. A distinction will sometimes be made between "transferring" the original and "copying" either the original or a copy of the original. Transferring will generally mean moving the original from one medium to another (such as one computer disk to another computer disk) and having what remains on the first medium no longer being characterized as the original. Transferring would be similar, in the physical world, to being able to lift the print and ink from safety paper stock and place it onto blank safety paper stock, leaving no print and ink on the first safety paper stock, or alternatively leaving the print and ink and transforming the first safety stock to ordinary paper (something that is not considered possible). Transferring would create a new instance that is characteristically identical to the first instance, while changing the characteristics of the original first instance. "Copying," by contrast, will generally refer to creating something that is characteristically different from the original and does not change the properties of the source from which the copy was made.

Systems and methods are provided for enabling a predetermined number of "original" digital works to be created and maintained. Distribution of the original digital works is controlled such that the original digital works can be distributed or transferred without increasing the number of original digital works that exist in the system at any given time beyond the predetermined number.

Figure 1B:
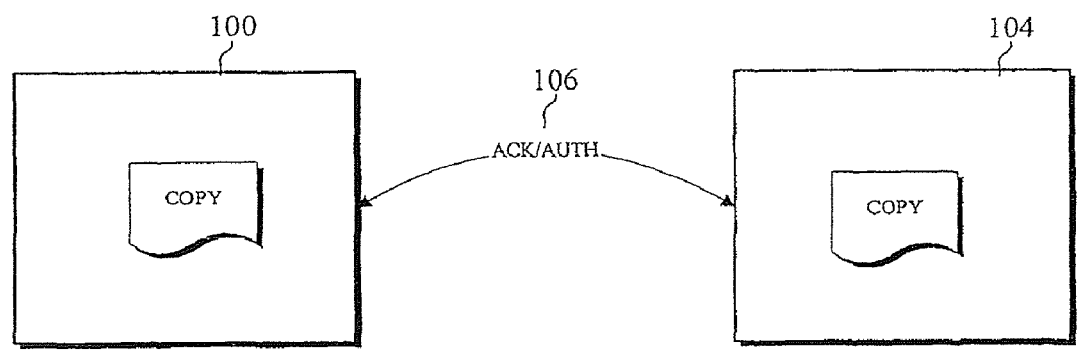
Figure 1C:

FIGS. 1A, 1B, and 1C illustrate the distribution of an electronic work in accordance with an embodiment of the present invention. Referring to FIG. 1A, the bearer or owner 100 of an original electronic work 102 initiates a transfer of the electronic work 102 to receiver 104. As shown in FIG. 1B, the parties exchange authorizations and/or acknowledgements in accordance with a predefined protocol 106. If the protocol 106 is interrupted or corrupted, at most one party will possess the original electronic work 102, or, as shown in FIG. 1B, neither party may possess the original. As shown in FIG. 1C, upon completion of the protocol, the recipient 104 will possess the original work, while the sender 100 may possess a copy of the original 108. However, the sender's copy (if any) will be such that it cannot be passed off as the original to other members of the system (e.g., it will have associated with it an attribute indicating that it is a copy, whereas the instance of the digital work that is in recipient 104's possession will have an attribute associated with it indicating that it is the original).

In one embodiment, digital rights management techniques—such as those described in commonly-assigned U.S. Pat. No. 5,892,900, entitled "Systems and Methods for Secure Transaction Management and Electronic Rights Protection," issued Apr. 6, 1999 ("the '900 patent") and U.S. Pat. No. 6,185,683, entitled "Trusted and Secure Techniques, Systems and Methods for Item Delivery and Execution," issued Feb. 6, 2001 (the entire contents of both of these patents are hereby expressly incorporated herein by reference)—are used in combination with a cryptographic two-party protocol to distinguish original electronic documents from copies, and to enable transfer or distribution of original electronic documents from one party to another. In a preferred embodiment, each original document and copy thereof is tagged as either an original or a copy. This tagging, and altering of the tag, is preferably performed in a secure and protected manner. In a preferred embodiment, digital rights management techniques are used to persistently protect the documents and tags. For example, the documents and/or tags may be encrypted or otherwise secured such that special hardware and/or software, such as that described in the '900 patent, is needed to access and/or modify their contents. For example, in one embodiment, documents and/or tags are copied and/or transferred between parties in secure electronic containers, such as those described in the '900 patent. These secure containers are processed by each party using hardware and/or software protected processing environments, embodiments of which are also described in the '900 patent, thus ensuring that each parties' interests (as well as the interests of others, such as document creators, owners, and/or distributors) are protected, and that the tagging protocol described herein is executed securely. The tags themselves can be implemented in the same manner as the rules and controls described in the '900 patent, thereby ensuring their security and persistent association with the documents to which they correspond. Alternatively, the tags can be implemented as fields within other rules or controls associated with a document, since documents will typically have a variety of other associated rules and controls, as described in the '900 patent and the '683 patent. These rules or policies may indicate that a different set of rights are available to the holder of an original document from those that are available to the holder of a copy. For example, an owner of an original may be able to assign the document to someone else: something the holder of a copy might not be able to do. Also, by ensuring that only one original exists, the owner of the original in this example would only be able to assign or transfer the original once.

As indicated above, in a preferred embodiment, a cryptographic two-party protocol is used to transfer an original document from one party to another, and to enable or ensure that: (1) the bearer (sender) of an electronic original, master, or restricted copy (collectively "original") can distribute it to another individual (recipient), and as a result of such a distribution will no longer have an original; (2) the recipient of an original document will now have the rights and privileges formerly held by the sender; (3) two "originals" will not exist during, or as a result of, the protocol's execution; and/or (4) certain failures in the transfer or protocol may result in no original existing, in which case the sender's and/or recipient's software creates a secure record of the failure, which an authorized party can examine and, if validated, create a new original.

Figure 2:
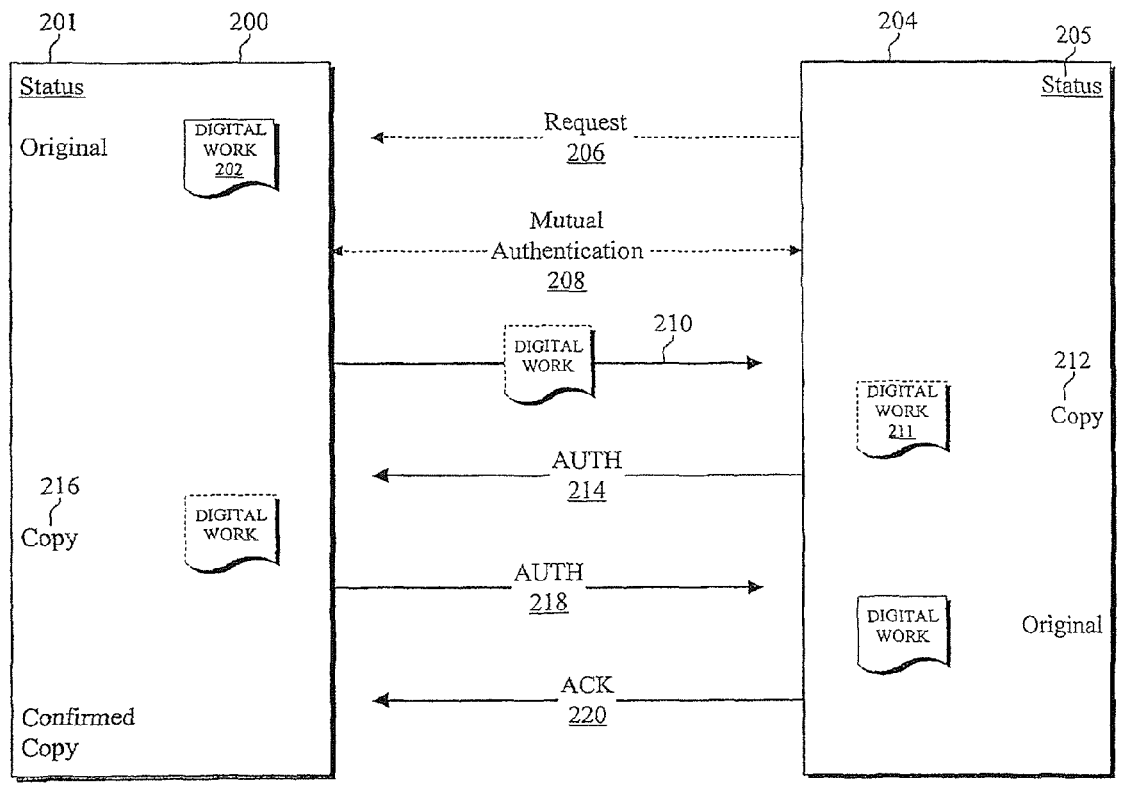
FIG. 2 illustrates a protocol for distributing an electronic work in accordance with an embodiment of the present invention.

An exemplary embodiment of the foregoing protocol is illustrated in FIG. 2, which shows, starting at the top and proceeding to the bottom, the sequence of communications between two parties 200 and 204, and the status 201/205 of each party's instance (if any) of an electronic work. As shown in FIG. 2, at some point an original digital work 202 resides in the protected computing environment of the bearer 200, the protected computing environment having been, in one embodiment, directly or indirectly enabled by a distributed security architecture (the distributed security architecture might also allow for the creation of originals, and/or the delegation of authority to create originals). Examples of such a protected computing environment can be found, for example, in the '900 patent and the '683 patent; however, any suitable protected computing environment could be used. Referring once again to FIG. 2, the bearer 200 decides to send the original 202 to the other party 204 in a peer-to-peer transaction. For example, the intended recipient 204 may have submitted a request 206 to the bearer 200 or the bearer may have submitted an offer to the requester. In a preferred embodiment, the proposed recipient 204 has a similar protected computing environment enabled by the distributed security architecture. Through mutual authentication using a suitable authentication protocol, the sender 200 and recipient 204 each determine whether the other party is qualified to perform this transfer (208). The sender 200 forwards a copy of the digital work to the recipient 204 (210). The forwarded digital work 211 is tagged as a copy (212), which is also denoted in FIG. 2 by the dashed lines used to draw digital work 211. The recipient 204 authorizes the sender 200 to change the tag 201 of the sender's instance of the digital work from "original" to "copy" (214). Once tagged as a copy (216), the sender 200 authorizes the recipient 204 to change the tag associated with its instance of the digital work from "copy" to "original" (218). In a preferred embodiment, the final transaction of the protocol is for the recipient 204 to acknowledge to the sender 200 that it has changed the tag 205 from "copy" to "original" (220).

Note that the protocol shown in FIG. 2 is designed such that at most one "original" exists at any given time. Thus, if the protocol is interrupted or terminated before completion, the system's control over the number of originals will not be breached. If, for example, the transmission of authorization 218 is interrupted or lost, such that it is not received by recipient 204, then neither party will possess an original. When party 204 fails to receive transmission 218 (perhaps after requesting it again and/or waiting a predefined amount of time), and/or when party 200 fails to receive acknowledgement 220 as a result, one or both of the parties can initiate a suitable error recovery procedure. For example, the parties could contact a trusted third party (or each other), and one of the copies of the digital work could be tagged as the original. Similarly, if any of the other communications are lost or interrupted, a suitable error-recovery procedure can be initiated to ensure that the protocol is completed. Depending on when the failure occurred, there may in fact have been no loss of an original and the parties could restart the protocol and successfully complete the transfer without requiring the intervention of a trusted third party.

It will be appreciated that many variations could be made to the protocol described in connection with FIG. 2 without departing from the principles of the present invention. For example, the order of some of the transmissions could be varied, certain transmissions could be eliminated, and/or certain other transmissions could be added. For example, in one embodiment the sender 200 might change the status of its instance of the digital work before transmitting the digital work to the recipient 204. The transmission 210 of the digital work might then be combined with the transmission of authorization 218. This combined transmission 210/218 would be followed by the transmission of acknowledgement 220 from recipient 204 to sender 200, and the transmission of authorization 214 would not be needed. Moreover, it should be appreciated that to the extent a mutual authentication procedure 208 is performed (as in a preferred embodiment), this procedure may be performed in any suitable manner. However, one preferred embodiment makes use of one of the authentication protocols described in Appendix A. In one embodiment, the distributed security architecture referred to above is also implemented in the manner described in Appendix A.

In one embodiment, the distributed security architecture includes one or more root authorities. For example, a root authority might exist for the purpose of establishing rules around who can or cannot transfer originals. For example, the root authority may create or authorize an issuing authority for the purpose of creating and transferring originals. The root and issuing authorities may be one or separate entities. The root authority may allow the issuing authority to delegate the authority to transfer originals to the recipient of the original. However, the root authority may choose not to allow the issuing authority to delegate the authority to create originals to another party. This use of delegation by the root authority would allow only the issuing authority to create originals, but allow all recipients of originals to transfer them to another recipient. The issuing authority in this illustration may, for example, be an issuer of bearer bonds or a department of motor vehicles issuing titles to automobiles. The issuing authority would preferably implement tight procedural and security controls to protect against unauthorized creation of originals. The root authority would supervise this process and ensure that it operates effectively and securely.

In some commercial or business transactions—such as payment of money for a bond, or the presentment of an automobile title and a related assignment document—the issuing authority would transfer an original document to a recipient. As a result of this transfer, the original would reside in the protected computing environment of the recipient or bearer. In this example, this computing environment would preferably have been directly or indirectly cryptographically-enabled by the root and/or issuing authority. The bearer might then decide to transfer the original to another party in a peer-to-peer transfer transaction in the manner described above in connection with FIG. 2.

The issuing authority might eventually be the recipient of the original in a transfer. This could be the case when the last bearer of a bond redeems the bond, or when an automobile is sold and the new owner presents the assigned title to the department of motor vehicles for a new title. The issuing authority might also be the party that would review the authenticity of the transaction records created upon the occurrence of certain failures in the cryptographic two-party protocol of FIG. 2, and, if necessary, issue a new original if the previous original had been destroyed.

In some embodiments, the systems and methods of the present invention can be applied to master copies of content. For example, a studio may, in advance of a general release, pre-distribute 100 restricted copies of a work to industry insiders. These restricted copies might have properties that the subsequently-released work would not. For example, a restricted copy might allow its holder to freely transfer it to another industry insider, but once transferred, the first holder might not be able to render the work. This embodiment would allow a set number of restricted copies to be freely circulated among authorized parties but would prevent the unauthorized creation of copies of the work for mass distribution, perhaps over the Internet.

In one embodiment, the content could be considered to be a digital entitlement for a product or service, and in a preferred embodiment a digital certificate may be used. In this embodiment, a holder of a certificate could be entitled to a product or service if it could be determined to be a holder of the original certificate (and conversely, the holder may not be entitled to the product or service if it is holding a mere copy of the certificate). For example, a holder (user) of an original certificate could transfer its certificate to the service provider, which would then become the holder of the original certificate. The service would operate for the user until the user requested its original certificate to be returned. This embodiment would prevent unauthorized users from enjoying the benefits of the product or service when they only possess a copy of the certificate. Further, it would allow the holder of the original certificate to transfer it to another one of its own protected environments or to another individual with a protected environment, similar to how a bus pass could be shared by a group of commuters while only allowing one commuter to ride a bus at any given time. Similarly, by, e.g., securely controlling the transfer of the original certificate (e.g., by requiring the purported certificate-holder to first authenticate him/herself), the system can prevent the unauthorized copying and use of a user's certificate, thus providing an advantage over other forms of authorization/payment, such as credit card information.

Figure 3:
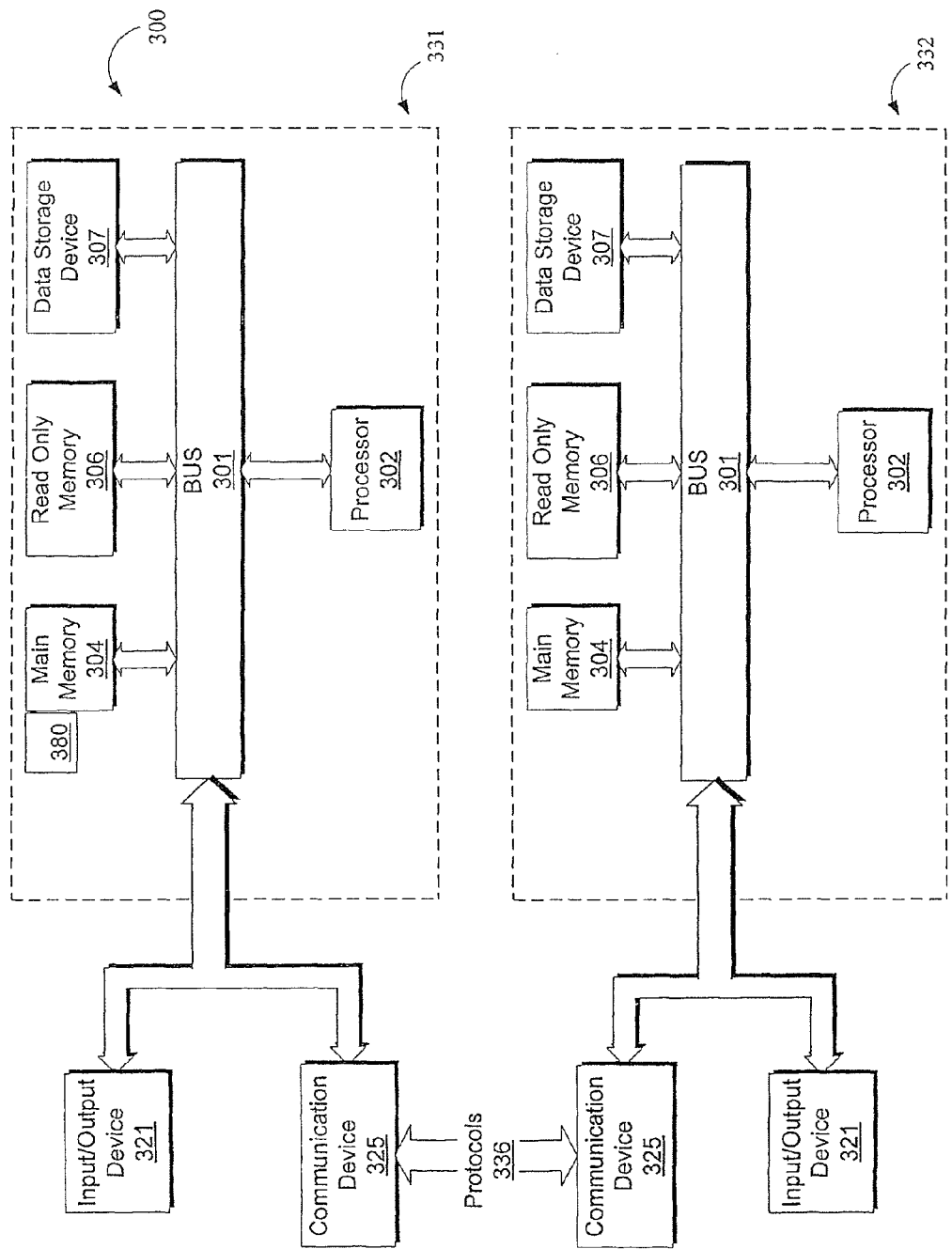
FIG. 3 is a block diagram illustrating a system for distributing an electronic work from one location to another location.

FIG. 3 illustrates a system for transferring a digital work from one location to another in accordance with embodiments of the present invention. Referring to FIG. 3, a computer system 300 comprises a first computer 331 and a second computer 332. The first and second computers may be configured to have protected computing environments such that digital works may reside therein. It should be appreciated that the term "computer" is being used in this context to refer generically to any computer system, including, e.g., personal computers, television set-top boxes, personal digital assistants (PDAs), cellular or other telephones, client-side computers, server-side computers, and the like. For ease of understanding, FIG. 3 illustrates a peer-to-peer type distribution network, in which peers possess similar hardware and software components; however, it will be appreciated that in other embodiments, either or both of these peers may only possess some suitable subset of the components illustrated in FIG. 3. Referring to FIG. 3, illustrative computers 331 and 332 each comprise some or all of the following components:

- a processor 302 for processing information;
- random access memory (RAM) or other dynamic storage device 304 (referred to sometimes as "main memory") for storing information and instructions to be executed by processor 302 and/or for storing temporary variables or other intermediate information during execution of instructions by processor 302;
- read only memory (ROM) and/or some other static storage device for storing information and instructions for processor 302;
- a data storage device 307 such as a magnetic disk or optical disc and its corresponding drive;
- one or more input/output devices 321, such as a cathode ray tube (CRT) or liquid crystal display (LCD) device; audio speakers; an alphanumeric input device such as a keyboard and/or a cursor control device such as a mouse or a trackball, for communicating information and/or command selections to processor 302;
- a communication device 325, such as a modem, a network interface card, or other commercially available network interface device, for accessing the second computer and/or remote servers via a network such as the Internet, a private corporate network, a local-area network, a wide-area network, a wireless network, or the like; and
- one or more buses 301 for coupling the aforementioned elements together.

As indicated above, computers 331/332 may be coupled to a number of other computers via a conventional network infrastructure, such as a company's Intranet and/or the Internet, for example.

The operation of computer 331 and computer 332 is controlled primarily by programs stored in each computer's system memory and executed by each computer's processor 302. These programs typically include an operating system, and, in a preferred embodiment, also include digital rights management software for implementing a protected processing environment, such as that described in the '900 patent, in which electronic works can be securely handled, and the rules and attributes associated with the electronic works securely maintained and enforced.

In the illustrative embodiment shown in FIG. 3, computer 331 may possess an original electronic work 380 in main memory 304. Computer 331 may initiate a transfer of the electronic work 380 to computer 332 by exchanging certain authorizations and/or acknowledgements, e.g., as described above in connection with FIG. 2. In a preferred embodiment, if this process is interrupted or corrupted, at most one party will possess the original electronic work 380. Alternatively, neither party may possess the original 380. Upon completion of the transfer, computer 332 will possess the original work 380, while computer 331 may possess a copy of the original or nothing at all. If computer 331 retains a copy, the copy will be configured such that it cannot be passed off as the original to other members of the system (e.g., it will have associated with it an attribute indicating that it is a copy, whereas the original work 380 will have an attribute associated with it indicating that it is the original).

Figure 4:
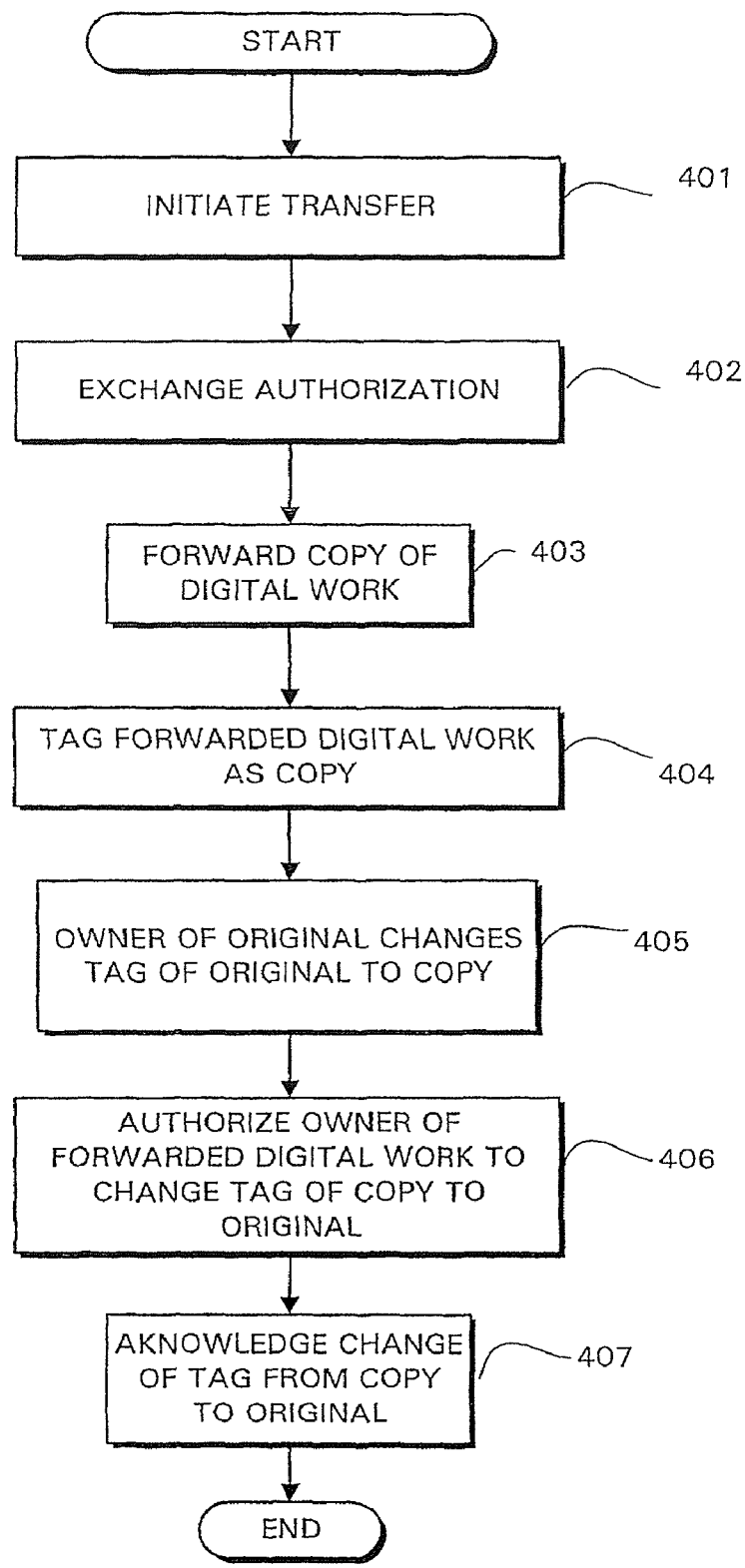
FIG. 4 is a flow diagram illustrating a method of transferring a digital work in accordance with an embodiment of the present invention.

FIG. 4 illustrates a method of sending an original work to a different location in accordance with another embodiment of the present invention. In step 401 the owner or potential buyer of an original electronic work initiates a transfer of the electronic work. In step 402 the parties exchange authorization and/or acknowledgement information to, e.g., securely identify themselves to each other. Next, the owner of the digital work forwards a copy of the digital work to the other party (403). The forwarded digital work is tagged as a copy (404). The owner/sender of the original digital work then changes the tag of its instance of the digital work from "original" to "copy" (405). Once tagged as a copy, the recipient is authorized to change the tag associated with its instance of the digital work from "copy" to "original" (406). In a preferred embodiment, the final transaction of the protocol is for the recipient to acknowledge to the sender that it has changed the tag from "copy" to "original" (407). Upon completion of the protocol, the recipient will possess the original work, while the sender possesses a copy of the original. However, the sender's copy (if any) will be such that it cannot be passed off as the original to other members of the system (e.g., it will have an attribute associated with it indicating that it is a copy, whereas the instance of the digital work that is in the recipient's possession will have an attribute associated with it indicating that it is the original). If the protocol is interrupted or corrupted, the communication is preferably terminated, and, as explained previously, preferably at most one of the parties will possess the original.

Although the foregoing invention has been described in some detail for purposes of clarity, it will be apparent that certain changes and modifications may be made without departing from the principles of the present invention. It should be noted that there are many alternative ways of implementing both the processes and apparatuses of the present invention. Accordingly, the present embodiments are to be considered as illustrative and not restrictive, and the invention is not to be limited to the specific details given herein.

What is claimed is:

1. A method of distributing a first original electronic work from a sender's site to a receiver's site, the first original electronic work having a securely and persistently associated first electronic attribute indicating that it is an original, the method comprising:
    establishing communication, by the sender's site, between the sender's site and the receiver's site;
    sending, from the sender's site to the receiver's site, first authentication information certifying at least one aspect of the sender's site;
    receiving, at the senders' site from the receiver's site, second authentication information certifying at least one aspect of the receiver's site;
    creating, by the sender's site, a first copy of the first original electronic work and securely and persistently associating with the first copy a second electronic attribute indicating that it is a copy;
    transmitting, from the sender's site, the first copy to the receiver's site;
    receiving, at the sender's site from the receiver's site, a first acknowledgement indicating receipt of the first copy by the receiver's site, and, responsive thereto, changing the first electronic attribute to indicate that it is a copy, thereby creating a second copy of the first original electronic work; and
    sending, from the sender's site to the receiver's site, an authorization authorizing the receiver's site to change the second electronic attribute to indicate that it is an original, thereby creating a second original electronic work,
    wherein the first and second copies are prevented from being successfully passed off as original electronic works and the second electronic attribute associated with the first copy of the electronic work is configured to be authenticated independently by the receiver's site after receipt of the first copy by the receiver's site.

2. A method as in claim 1, further comprising:
    receiving, at the sender's site from the receiver's site, a second acknowledgement indicating that the receiver's site successfully changed the second electronic attribute associated with the first copy to indicate that it is an original.

3. The method of claim 1, wherein the senders site comprises a first protected computing environment operable to substantially impede users of the sender's site from successfully tampering with the first and second electronic attributes.

4. The method of claim 3, wherein the step of sending first authentication information includes sending information regarding the presence or nature of the first protected computing environment at the sender's site.

5. The method of claim 1, wherein the step of receiving second authentication information includes receiving information regarding the presence or nature of a second protected computing environment at the receiver's site operable to substantially impede users of the receiver's site from successfully tampering with the first and second electronic attributes.

6. The method of claim 2, further comprising:
    notifying, by the sender's site, a system administrator if the second acknowledgement is not received by the sender's site within a predetermined period of time.

7. The method of claim 1, wherein the original electronic work is selected from the group consisting of: ebooks, music, documents, bearer bonds, currency, movies, and software.

8. The method of claim 1, wherein at most one electronic work with an electronic attribute indicating that it is an original exists at the sender's site and the receiver's site during the steps of the method.

9. The method of claim 1, wherein one or more types of available use of the first and second copies by the sender's and/or receiver's sites is limited from one or more types of available use of original electronic works.

10. The method of claim 1, wherein the electronic work is a digital certificate.

11. A non-transitory computer-readable storage medium storing instructions that, when executed by a processor included in a sender's site, are configured to cause the processor to perform a method for sending an original electronic work from the sender's site to a receiver's site, the method including:
   establishing communication with the receiver's site;
   exchanging authentication information with the receiver's site;
   generating a first copy of a first original electronic work, and securely and persistently associating a first electronic attribute with the first copy indicating that it is a copy;
   sending the first copy to the receiver's site;
   receiving a first acknowledgement from the receiver's site, the first acknowledgement indicating the receipt of the first copy by the receiver's site, and, responsive thereto, changing a second electronic attribute associated with the first original electronic work to indicate that it is a copy, thereby creating a second copy of the first original electronic work;
   sending, by the sender's site, an authorization to the receiver's site authorizing and directing the receiver's site to securely change the first electronic attribute associated with the first copy to indicate that it is an original, thereby creating a second original electronic work, wherein the first and second copies are prevented from being successfully passed off as original electronic works and the first electronic attribute associated with the first copy is configured to be authenticated independently by the receiver's site after receipt of the first copy by the receiver's site.

12. The non-transitory computer-readable storage medium of claim 11 further storing instructions that, when executed by the processor included in the sender's site, cause the processor to perform a method including:
   receiving a second acknowledgement from the receiver's site, the second acknowledgement indicating that the receiver's site successfully changed the first electronic attribute associated with the first copy to indicate that it is an original.

13. The non-transitory computer-readable storage medium of claim 11, wherein the processor comprises a protected computing environment being operable to substantially impede users of the sender's site from successfully tampering with the first and second electronic attributes.

14. The non-transitory computer-readable storage medium of claim 13, wherein the step of exchanging authentication information includes exchanging information regarding the presence or nature of the protected computing environment at the sender's site and a protected computing environment at the receiver's site.

15. The non-transitory computer-readable storage medium of claim 11 further storing instructions that, when executed by the processor included in the sender's site, cause the processor to perform a method for including:
   receiving a second acknowledgement from the receiver's site, the second acknowledgement indicating that the receiver's site successfully changed the first electronic attribute associated with the first copy to indicate that it is an original; and
   notifying a system administrator if the second acknowledgement is not received from the receiver's site within a predetermined period of time.

16. The non-transitory computer-readable storage medium of claim 11, wherein the original electronic work is selected from the group consisting of: ebooks, music, documents, bearer bonds, currency, movies, and software.

17. The non-transitory computer-readable storage medium of claim 11, wherein at most one electronic work with an electronic attribute indicating that it is an original exists at the sender's site and the receiver's site during the performance of the method.

18. A non-transitory computer-readable storage medium storing instructions that, when executed by a processor included in a receiver's site, are configured to cause the processor to perform a method for receiving an original electronic work from a sender's site, the method including:
   establishing communication with the sender's site;
   exchanging authentication information with the sender's site;
   receiving a first copy of a first original electronic work from the sender's site, the first copy having a first electronic attribute securely and persistently associated with it indicating it is a copy, the first original electronic work being located at the sender's site;
   sending a first acknowledgement to the sender's site, the first acknowledgement indicating the receipt of the first copy and directing the sender's site to change second electronic attribute securely and persistently associated with the first original electronic work to indicate that is a copy, thereby creating a second copy of the first original electronic work;
   receiving, at the receiver's site, authorization from the sender's site authorizing that the first electronic attribute associated with the first copy be changed to indicate that it is an original; and
   securely changing the first electronic attribute associated with the first copy to indicate that it is an original, thereby creating a second original electronic work,
   wherein the first and second copies are prevented from being successfully passed off as original electronic works and the first electronic attribute associated with the first copy is configured to be authenticated independently by the receiver's site after receipt of the first copy by the receiver's site.

19. The non-transitory computer-readable storage medium of claim 18 further storing instructions that, when executed by the processor included in the receiver's site, cause the processor to perform a method including:
   sending a second acknowledgement to the sender's site, the second acknowledgement indicating that the first electronic attribute associated with the first copy was changed to indicate that it is an original.

20. The non-transitory computer-readable storage medium of claim 18, wherein the processor comprises a protected computing environment being operable to substantially impede users of the receiver's site from successfully tampering with the first electronic attribute associated with the first copy.

21. The non-transitory computer-readable storage medium of claim 20, wherein the step of exchanging authentication information includes exchanging information regarding the presence or nature of the protected computing environment at the receiver's site and a protected computing environment at the sender's site.

22. The non-transitory computer-readable storage medium of claim 18 further storing instructions that, when executed by the processor included in the receiver's site, cause the processor to perform a method including:

sending, a second acknowledgement to the sender's site, the second acknowledgement indicating that the first electronic attribute associated with the first copy was changed to indicate that it is an original.

23. The non-transitory computer-readable storage medium of claim 18 further storing instructions that, when executed by the processor included in the receiver's site, cause the processor to perform a method for including:

notifying a system administrator authorization is not received within a predetermined period of time following the sending of the first acknowledgement.

24. The non-transitory computer-readable storage medium of claim 18, wherein the original electronic work is selected from the group consisting of: ebooks, music, documents, bearer bonds, currency, movies, and software.

25. The non-transitory computer-readable storage medium of claim 18, wherein at most one electronic work with an electronic attribute indicating that it is an original exists at the sender's site and the receiver's site during the performance of the method.

* * * * *